US012597221B2

(12) United States Patent
Hamano

(10) Patent No.: US 12,597,221 B2
(45) Date of Patent: Apr. 7, 2026

(54) IMAGE PROCESSING APPARATUS AND ELECTRONIC APPARATUS

(71) Applicant: CANON KABUSHIKI KAISHA, Tokyo (JP)

(72) Inventor: Hideyuki Hamano, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 21 days.

(21) Appl. No.: 18/449,072

(22) Filed: Aug. 14, 2023

(65) Prior Publication Data

US 2023/0386166 A1 Nov. 30, 2023

Related U.S. Application Data

(62) Division of application No. 16/547,906, filed on Aug. 22, 2019, now Pat. No. 11,763,538.

(30) Foreign Application Priority Data

| Aug. 31, 2018 | (JP) | ................................. | 2018-163565 |
| Dec. 7, 2018 | (JP) | ................................. | 2018-229964 |
| Dec. 7, 2018 | (JP) | ................................. | 2018-229965 |

(51) Int. Cl.
*G06V 10/25* (2022.01)
*G06F 18/24* (2023.01)
(Continued)

(52) U.S. Cl.
CPC .............. *G06V 10/25* (2022.01); *G06F 18/24* (2023.01); *G06F 18/2431* (2023.01); *H04N 23/633* (2023.01)

(58) Field of Classification Search
CPC ..... G06V 10/25; G06F 18/24; G06F 18/2431; H04N 23/633; H04N 23/64; H04N 23/672; H04N 23/675; H04N 25/704
See application file for complete search history.

(56) References Cited

U.S. PATENT DOCUMENTS 7,561,748 B2 * 7/2009 Suzuki ................. H04N 23/675
382/250
8,160,437 B2 4/2012 Hamano
(Continued)

FOREIGN PATENT DOCUMENTS

| JP | 2010-186004 A | 8/2010 |
| JP | 2011-209450 A | 10/2011 |
(Continued)

OTHER PUBLICATIONS

Office Action dated Aug. 30, 2022, in Japanese Patent Application No. 2018-229964.

*Primary Examiner* — Wesley J Tucker
(74) *Attorney, Agent, or Firm* — Venable LLP

(57) ABSTRACT

An image processing apparatus includes an area setter configured to set a target area in a first image among a plurality of captured images acquired by imaging at different time from each other, an area detector configured to detect a corresponding area relevant to the target area in a plurality of second images among the plurality of captured images, a focus state acquirer configured to acquire focus states of the target area and the corresponding area, and a classification processor configured to perform classification processing that classifies the plurality of captured images into a plurality of groups according to the focus states.

11 Claims, 21 Drawing Sheets

(51) Int. Cl.
  G06F 18/2431 (2023.01)
  H04N 23/63 (2023.01)

(56) References Cited

U.S. PATENT DOCUMENTS

| | | | | |
|---|---|---|---|---|
| 8,390,730 B2 * | 3/2013 | Takada | ................. | H04N 23/635 |
| | | | | 348/349 |
| 9,025,821 B2 | 5/2015 | Ishii | | |
| 9,129,150 B2 * | 9/2015 | Irimoto | ................. | G06V 20/30 |
| 9,824,261 B2 | 11/2017 | Kim | | |
| 9,936,122 B2 | 4/2018 | Hamano | | |
| 10,213,093 B2 * | 2/2019 | Ichikawa | ........... | A61B 1/00009 |
| 10,694,093 B2 | 6/2020 | Katayama | | |
| 10,895,730 B2 | 1/2021 | Yoshida et al. | | |
| 11,763,538 B2 * | 9/2023 | Hamano | ............. | H04N 23/672 |
| | | | | 348/231.6 |
| 12,003,853 B2 * | 6/2024 | Rivard | ................. | H04N 23/611 |
| 12,062,209 B2 * | 8/2024 | Kokubun | ............. | H04N 23/635 |
| 2008/0136958 A1 | 6/2008 | Nakahara | | |
| 2014/0009666 A1 | 1/2014 | Hamano | | |
| 2014/0085507 A1 | 3/2014 | Pillman et al. | | |
| 2014/0193088 A1 * | 7/2014 | Capata | ................. | G06V 40/166 |
| | | | | 382/228 |
| 2016/0381284 A1 | 12/2016 | Aoki et al. | | |
| 2017/0034443 A1 | 2/2017 | Kwon et al. | | |
| 2017/0265725 A1 | 9/2017 | Ichikawa et al. | | |
| 2018/0293456 A1 | 10/2018 | Bredno et al. | | |
| 2020/0053288 A1 * | 2/2020 | Kim | .................... | H04N 23/667 |

FOREIGN PATENT DOCUMENTS

| | | |
|---|---|---|
| JP | 2013-145314 A | 7/2013 |
| JP | 2017-135660 A | 8/2017 |
| JP | 2018-066889 A | 4/2018 |

* cited by examiner

FIG. 3A                    FIG. 3B

IMAGE PROCESSING APPARATUS AND ELECTRONIC APPARATUS

This is a divisional of U.S. patent application Ser. No. 16/547,906, filed Aug. 22, 2019.

BACKGROUND OF THE INVENTION

Field of the Invention

The present invention relates to an image processing apparatus configured to provide image processing for a captured image.

Description of the Related Art

One electronic apparatus, such as a digital camera and a camera-equipped cellular phone, can provide autofocus of an imaging plane phase difference detection method (referred to as an imaging plane phase difference AF hereinafter) as disclosed in Japanese Patent Laid-Open No. ("JP") 2011-209450. JP 2011-209450 discloses a method of classifying and recording a plurality of captured images obtained by continuous imaging, according to whether or not they are in-focus images.

An area (focus determination area) used to determine a focus state in the captured image depend on the user's intention. For example, in imaging the face of a person, the user arbitrarily selects which of the right eye and the left eye is to be focused and which of the eyelash and the eye is to be focused. JP 2011-209450 is silent about a method for selecting a focus determination area according to the user's intention.

SUMMARY OF THE INVENTION

The present invention provides an image processing apparatus and an electronic apparatus having the same, each of which enables a focus state of an area selected by a user to be confirmed in a plurality of captured images.

An image processing apparatus according to one aspect of the present invention includes an area setter configured to set a target area in a first image among a plurality of captured images acquired by imaging at different time from each other, an area detector configured to detect a corresponding area relevant to the target area in a plurality of second images among the plurality of captured images, a focus state acquirer configured to acquire focus states of the target area and the corresponding area, and a classification processor configured to perform classification processing that classifies the plurality of captured images into a plurality of groups according to the focus states. An electronic apparatus including an image sensor configured to capture an image of an object, and the above image processing apparatus also constitutes another aspect of the present invention.

An image processing apparatus according to another aspect of the present invention includes a memory configured to store an image having viewpoint information, an image group setter configured to set a plurality of the images captured in chronological order as an image group, a target area setter configured to set a target area to confirm a focus state in the image, an evaluation area setter configured to set an area corresponding to a predetermined area in each image of the image group as an evaluation area, and a focus state detector configured to detect the focus state of the image. The evaluation area setter detects an area corresponding to the target area as a first evaluation area, and detects an area different at least in part from the target area as a second evaluation area. The focus state detector performs a first focus state detection for detecting a focus state of the first evaluation area, and a second focus state detection for detecting a focus state of the second evaluation area.

An image processing apparatus according to another aspect of the present invention includes a memory configured to store a plurality of images, an acquirer configured to acquire information on a first scale and a second scale from each image, an evaluation updater configured to update the evaluation regarding at least one of the first scale and the second scale, an image group setter configured to set at least part of the plurality of images as an image group on the first scale, a classification processor configured to perform classification processing that classifies the image group into a plurality of groups using the second scale, and a display unit configured to display information on the image. The classification processor updates the plurality of groups as the evaluation updater updates the evaluation, and the display unit displays information on the number of images in the group.

Further features of the present invention will become apparent from the following description of exemplary embodiments with reference to the attached drawings.

DESCRIPTION OF THE EMBODIMENTS

Referring now to the accompanying drawings, a description will be given of embodiments according to the present invention.

First Embodiment

Figure 1:
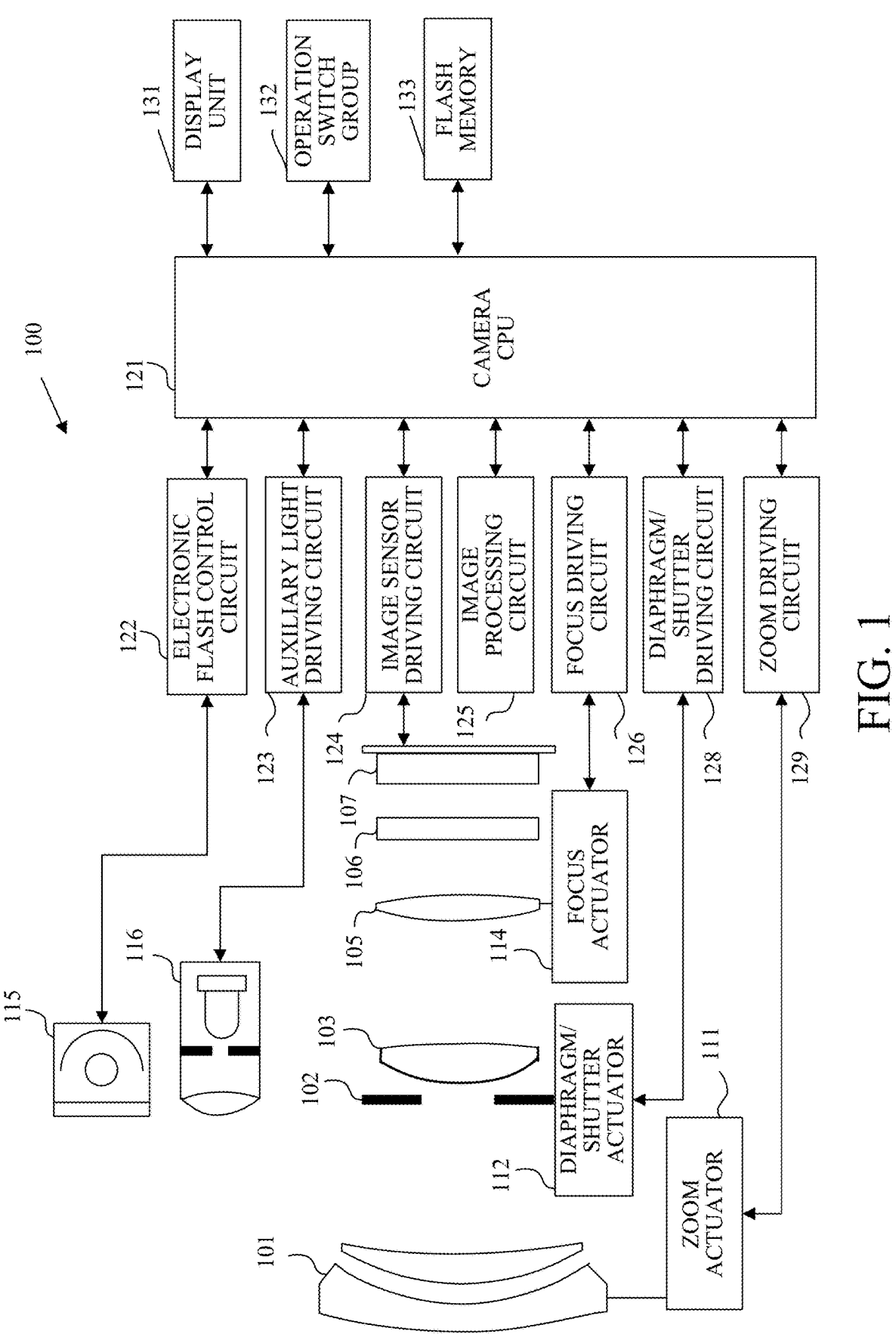
FIG. 1 is a block diagram showing a configuration of a camera according to a first embodiment of the present invention.

FIG. 1 illustrates the configuration of an electronic apparatus including an image processing apparatus according to a first embodiment of the present invention or a camera 100 as an imaging apparatus. In FIG. 1, a first lens unit 101 is disposed closest to the object (front side) of the imaging optical system as an imaging optical system, and is held movably in the optical axis direction. A diaphragm/shutter 102 adjusts a light amount by adjusting its aperture diameter, and serves as a shutter for controlling the exposure time in capturing a still image. A second lens unit 103 moves in the optical axis direction integrally with the diaphragm/shutter 102, and provides a magnification variation (zooming) with the first lens unit 101 moving in the optical axis direction.

A third lens unit (focus lens) 105 moves in the optical axis direction for focusing. An optical low-pass filter 106 is an optical element that reduces a false color and moiré in a captured image. The first lens unit 101, the diaphragm/shutter 102, the second lens unit 103, the third lens unit 105, and the optical low-pass filter 106 constitute an imaging optical system.

A zoom actuator 111 rotates an unillustrated cam barrel around the optical axis to move the first lens unit 101 and the second lens unit 103 in the optical axis direction by the cam provided to the cam barrel for the magnification variation. A diaphragm/shutter actuator 112 drives a plurality of unillustrated light shielding blades in the opening and closing direction for adjusting the light amount and the shutter operation of the diaphragm/shutter 102. A focus actuator 114 moves the third lens unit 105 in the optical axis direction for focusing.

A focus driving circuit 126 drives the focus actuator 114 in accordance with a focus driving command from the camera CPU 121 to move the third lens unit 105 in the optical axis direction. A diaphragm/shutter driving circuit 128 drives the diaphragm/shutter actuator 112 in accordance with a diaphragm/shutter driving command from the camera CPU 121. A zoom driving circuit 129 drives the zoom actuator 111 according to the zoom operation of the user.

This embodiment describes that the imaging optical system, the actuators 111, 112, and 114, and the driving circuits 126, 128, and 129 integrally provided to the camera body including an image sensor 107. However, the interchangeable lens having the imaging optical system, the actuators 111, 112 and 114, and the driving circuits 126, 128 and 129 may be detachable from the camera body.

An electronic flash 115 has a light emitting element such as a Xenon tube or an LED and emits light for illuminating an object. An AF assisting light emitter 116 has a light emitting element such as an LED, and projects an image of a mask having a predetermined aperture pattern onto an object through a projection lens to improve the focus detection performance on a dark or low contrast object. An electronic flash control circuit 122 controls the electronic flash 115 to light in synchronization with the imaging operation. An auxiliary light (driving) circuit 123 controls the AF auxiliary light emitter 116 to light in synchronization with the focus detection operation.

The camera CPU 121 governs a variety of controls in the camera 100. The camera CPU 121 includes a calculator, a ROM, a RAM, an A/D converter, a D/A converter, a communication interface circuit, and the like. The camera CPU 121 drives various circuits in the camera 100 according to a computer program stored in the ROM, and controls a series of operations such as AF, imaging, image processing, and recording. The camera CPU 121 serves as an image processing apparatus.

The image sensor 107 includes a two-dimensional CMOS photo-sensor including a plurality of pixels and its peripheral circuit, and is disposed on the imaging plane of the imaging optical system. The image sensor 107 photoelectrically converts an object image formed by the imaging optical system. An image sensor driving circuit 124 controls the operation of the image sensor 107, A/D-converts an analog signal generated by the photoelectric conversion, and transmits a digital signal to the camera CPU 121. An image processing circuit 125 performs image processing, such as a pixel defect correction, a y-conversion, a color interpolation, and a JPEG compression, for imaging data as the digital signal from the image sensor driving circuit 124, and generates image data used for a live-view image to be displayed or a captured image to be recorded.

The display unit 131 includes a display device such as an LCD, and displays information relating to an imaging mode of the camera 100, a preview image before imaging, a confirmation image after imaging, an index of the focus detection area, an in-focus image, etc. An operation switch group 132 includes a main (power) switch, a release (imaging trigger) switch, a zoom operation switch, an imaging mode selection switch, and the like, and is operated by the user. A flash memory 133 records a captured image. The flash memory 133 can be attached to and detached from camera 100.

Figure 2:
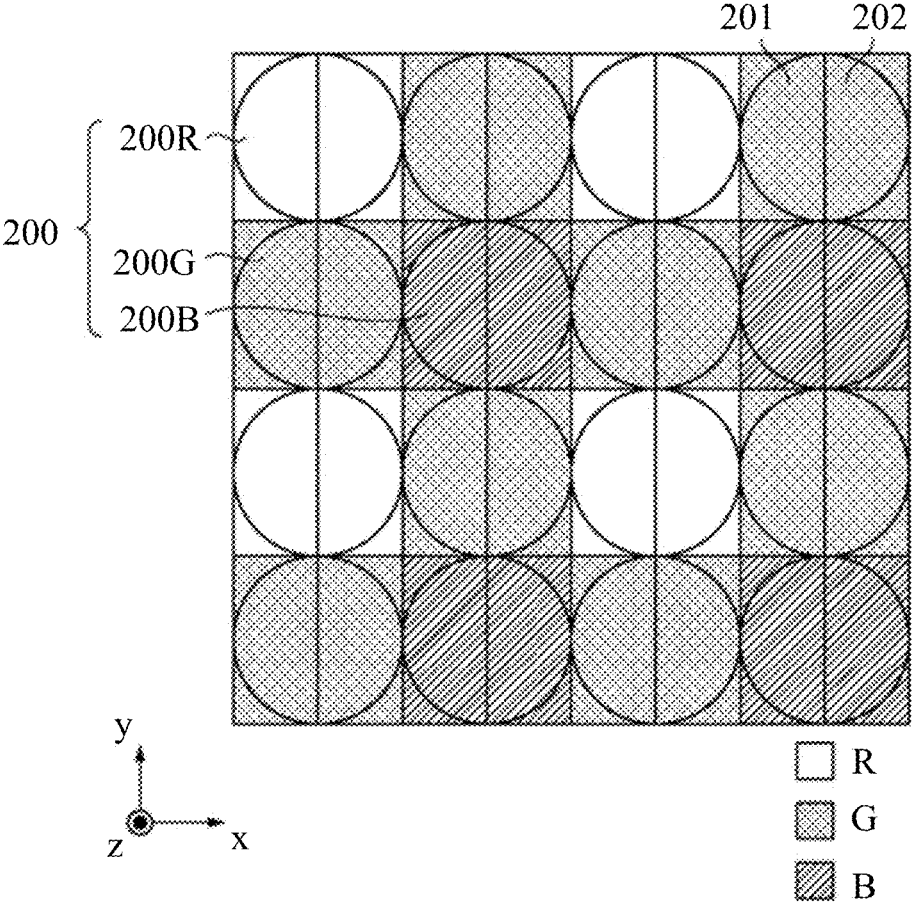
FIG. 2 illustrates a pixel array in the camera according to the first embodiment.

Referring now to FIG. 2, a description will be given of a pixel array of the image sensor 107. FIG. 2 illustrates four imaging pixels of 4 pixel columns×4 pixel rows in the image sensor 107 viewed from the optical axis direction (z direction).

One pixel unit 200 includes four imaging pixels arranged in two rows and two columns. A large number of pixel units 200 arrayed on the image sensor 107 can provide a photoelectric conversion of a two-dimensional object image. An imaging pixel (referred to as an R pixel hereinafter) 200R having a spectral sensitivity of R (red) is disposed at the upper left in the one pixel unit 200, and an imaging pixel (referred to as a G pixel hereinafter) 200G having a spectral sensitivity of G (green) are disposed at the upper right and lower left. An imaging pixel (referred to as a B pixel hereinafter) 200B having a spectral sensitivity of B (blue) is disposed at the lower right. Each imaging pixel includes a first focus detection pixel 201 and a second focus detection pixel 202 divided in the horizontal direction (x direction).

In the image sensor 107 in this embodiment, a pixel pitch P of imaging pixels is 4 μm, and the number N of imaging pixels is horizontally (x) 5575 columns×vertically (y) 3725 rows=about 20.75 million pixels. A pixel pitch PAF of the focus detection pixels is 2 μm, and the number of focus detection pixels NAF is horizontally 11150 rows×vertically 3725 rows=about 41.5 million pixels.

This embodiment describes each imaging pixel divided into two in the horizontal direction, but may divide it in the vertical direction. While the image sensor 107 according to this embodiment has a plurality of imaging pixels each including the first and second focus detection pixels, the imaging pixel and the first and second focus detection pixels may be provided as separate pixels. For example, the first and second focus detection pixels may be discretely disposed among the plurality of imaging pixels.

Figure 3:
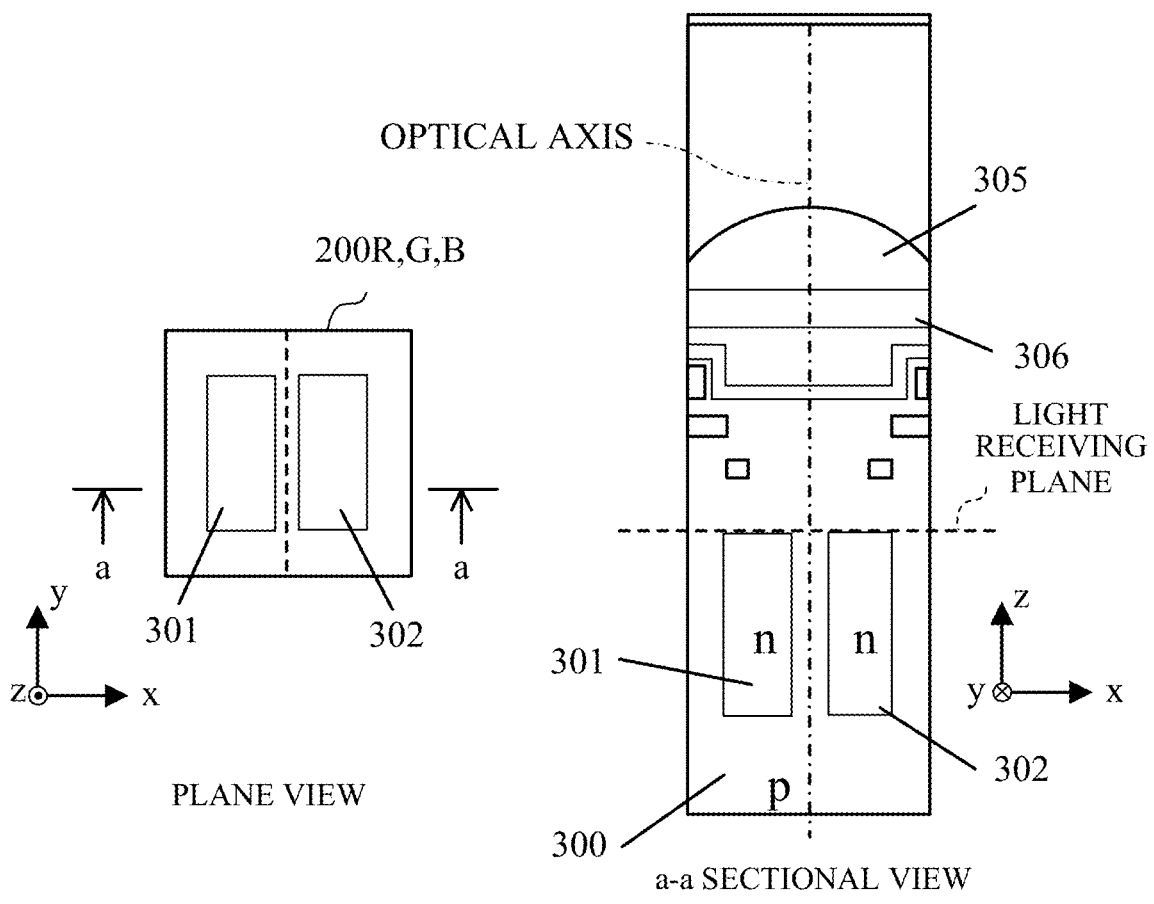
FIGS. 3A and 3B are a plan view and a sectional view of a pixel according to the first embodiment.

FIG. 3A illustrates one imaging pixel (200R, 200G, 200B) viewed from the light receiving plane side (+z direction) of the image sensor 107. FIG. 3B illustrates an a-a section of the imaging pixel in FIG. 3A viewed from the −y direction. As illustrated in FIG. 3B, one imaging pixel is provided with one micro lens 305 for condensing incident light.

The imaging pixel is provided with photoelectric converters 301 and 302 divided into N (two in this embodiment) in the x direction. The photoelectric converters 301 and 302 correspond to the first focus detection pixel 201 and the second focus detection pixel 202, respectively. The centers of gravity of the photoelectric converters 301 and 302 are decentered to the −x side and the +x side of the optical axis of the micro lens 305, respectively.

An R, G, or B color filter 306 is provided between the micro lens 305 and the photoelectric converters 301 and 302 in each imaging pixel. The spectral transmittance of the color filter may be changed for each photoelectric converter, or the color filter may be omitted.

The light incident on the imaging pixel from the imaging optical system is collected by the micro lens 305, separated by the color filter 306, then received by the photoelectric converters 301 and 302, and photoelectrically converted.

Figure 4:
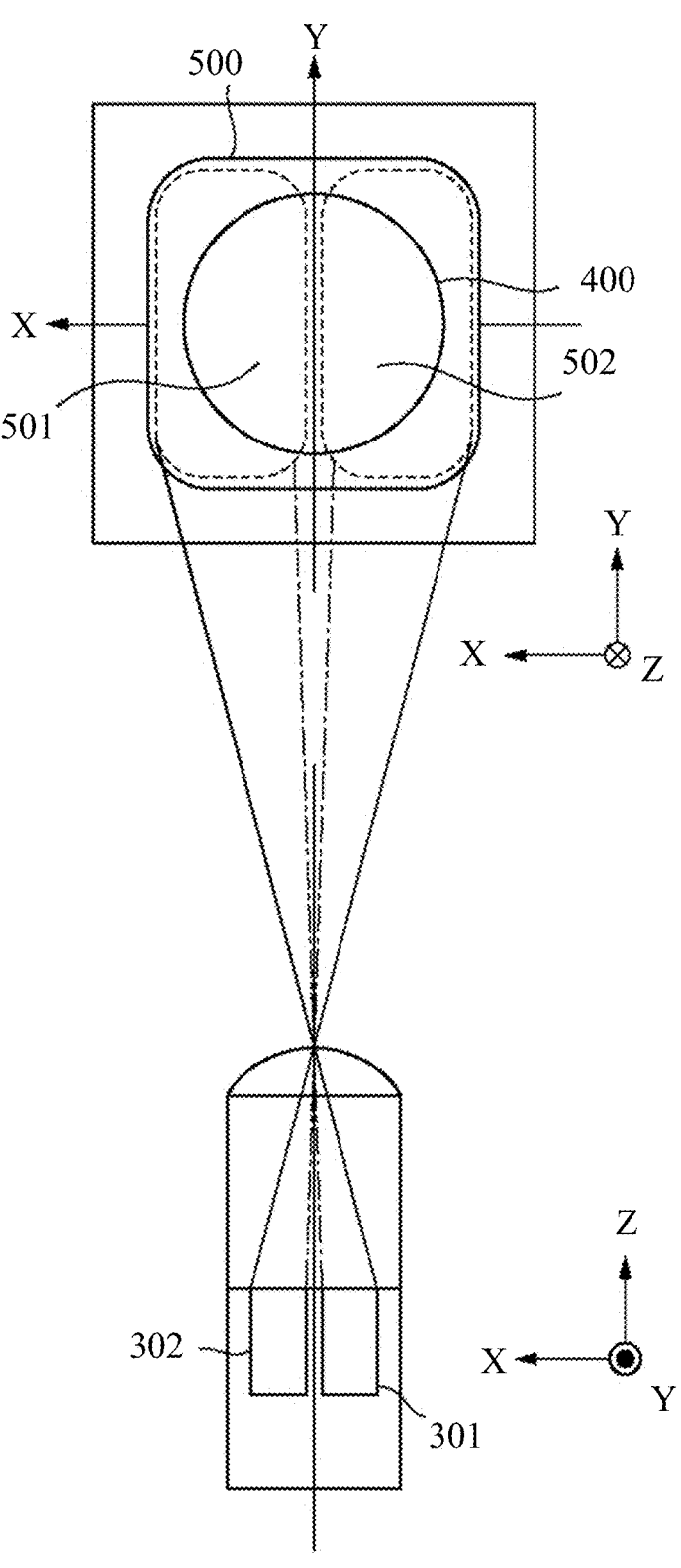
FIG. 4 explains a pixel structure according to the first embodiment.

Referring now to FIG. 4, a description will be given of a relationship between the pixel structure and the pupil division illustrated in FIGS. 3A and 3B. FIG. 4 illustrates the a-a section of the imaging pixel illustrated in FIG. 3A viewed from the +y side, and illustrates the exit pupil of the imaging optical system. In FIG. 4, in order to correspond to the coordinate axis of the exit pupil, the x direction and the y direction of the imaging pixel are reversed with respect to FIG. 3B.

A first pupil area 501 whose center of gravity is decentered on the +X side of the exit pupil is an area having a substantially conjugate relationship with the light receiving plane of the photoelectric converter 301 on the −x side of the imaging pixel by the micro lens 305. The light flux that has passed the first pupil area 501 is received by the photoelectric converter 301 or the first focus detection pixel 201. The second pupil area 502 whose center of gravity is decentered on the −x side of the exit pupil is an area having a substantially conjugate relationship with the light receiving plane of the photoelectric converter 302 on the +x side of the imaging pixel by the micro lens 305. The light flux that has passed through the second pupil area 502 is received by the photoelectric converter 302 or the second focus detection pixel 202. A pupil area 500 is a pupil area that can receive light in the entire imaging pixel in which all the photoelectric converters 301 and 302 (first and second focus detection pixels 201 and 202) are combined.

Figure 5:
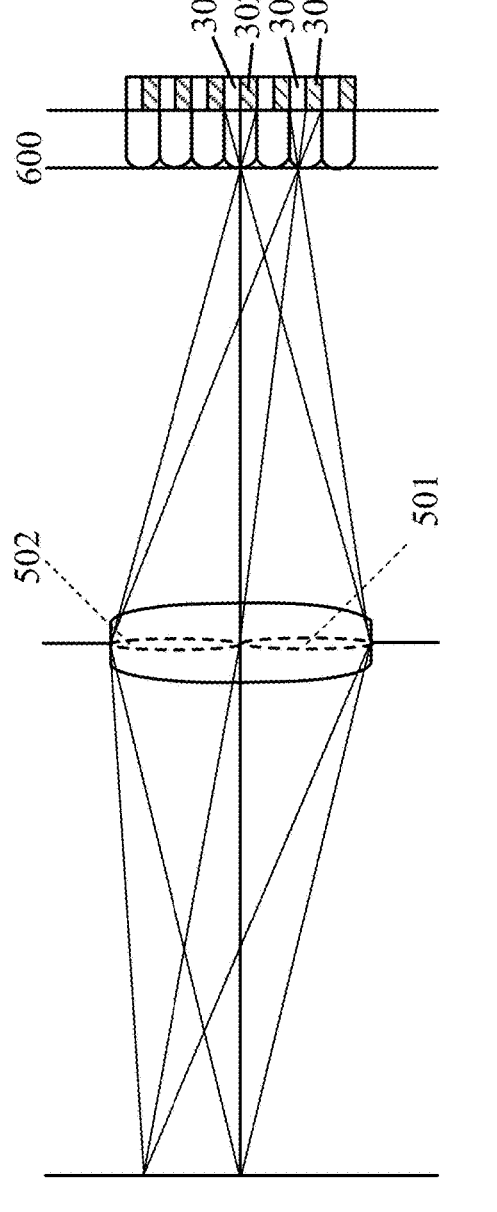
FIG. 5 explains a pupil division according to the first embodiment.

FIG. 5 illustrates a pupil division by the image sensor 107. A pair of light fluxes respectively passing through the first pupil area 501 and the second pupil area 502 enter pixels on the image sensor 107 at different angles, and are divided by the first and second focus detection pixels 201 and 202 divided into two. This embodiment collects output signals from a plurality of first focus detection pixels 201 of the image sensor 107 to generate a first focus detection signal, and output signals from a plurality of second focus detection pixels 202 to generate a second focus detection signal. An output signal from the first focus detection pixel 201 of the plurality of imaging pixels and an output signal from the second focus detection pixel 202 are added to generate an imaging pixel signal. The imaging pixel signals from the plurality of imaging pixels are combined to generate an imaging signal for generating an image having a resolution equivalent to the number N of effective pixels.

Figure 6:
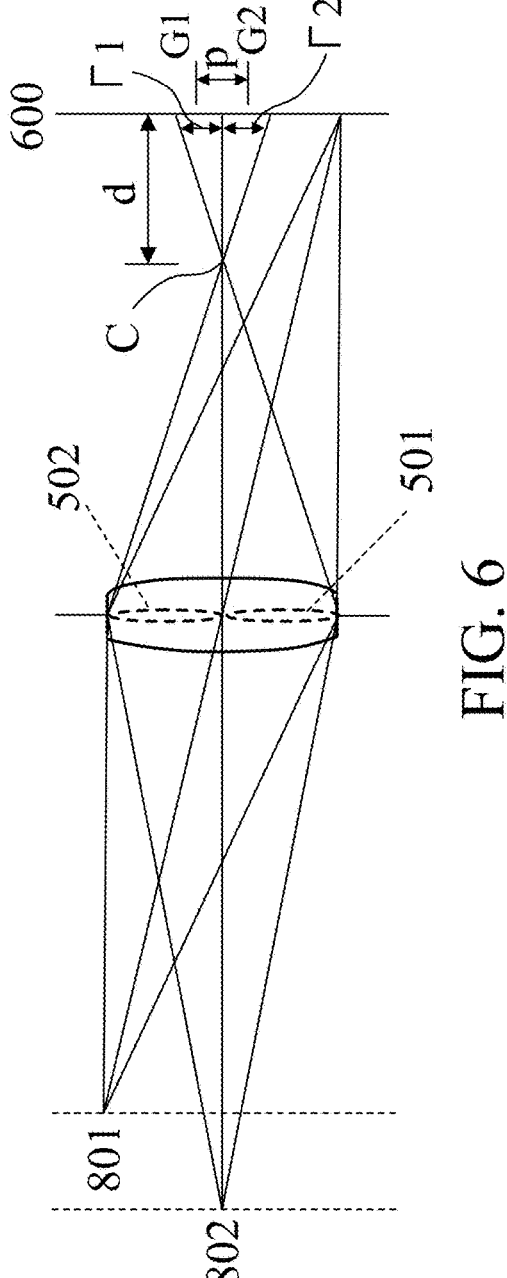
FIG. 6 illustrates a relationship between a defocus amount and an image shift amount according to the first embodiment.

Referring now to FIG. 6, a description will be given of a relationship between the defocus amount of the imaging optical system and the phase difference (image shift amount) between the first focus detection signal and the second focus detection signal acquired from the image sensor 107. The image sensor 107 is disposed on the imaging plane 600 in the figure, and as described with reference to FIGS. 4 and 5, the exit pupil of the imaging optical system is divided into two or the first pupil area 501 and the second pupil area 502. For a defocus amount d, a distance (size) from an imaging position C of the light flux from the object (801, 802) to the imaging plane 600 is set to |d⊕. Then, the front focus state where the imaging position C is located on the object side of the imaging plane 600 is defined as a negative sign (d<0), and the rear focus state where the imaging position C is located on the opposite side to the object with respect to the imaging plane 600 is defined as a positive sign (d>0). In the in-focus state where the imaging position C is located on the imaging plane 600, d=0. The imaging optical system is in focus (d=0) on the object 801, and in the front focus state (d<0) relative to the object 802. The front focus state (d<0) and the rear focus state (d>0) are collectively referred to as a defocus state (|d|>0).

In the front focus state (d<0), the light flux from the object 802 that has passed the first pupil area 501 (second pupil area 502) is once condensed and then spreads over a width Γ1 (Γ2) around a gravity center position G1 (G2) of the light flux as the center, and forms a blurred image on the imaging plane 600. The blurred image is received by each first focus detection pixel 201 (second focus detection pixel 202) on the image sensor 107, and a first focus detection signal (second focus detection signal) is generated. In other words, the first focus detection signal (second focus detection signal) is a signal representing an object image in which the object 802 is blurred by the blur width Γ1 (Γ2) at the gravity center position G1 (G2) of the light flux on the imaging plane 600.

The blur width Γ1 (Γ2) of the object image increases substantially in proportion to the increase of the magnitude |d| of the defocus amount d. Similarly, a magnitude |p| of an image shift amount p (=difference G1−G2 of the gravity center position of the light flux) between the first focus detection signal and the second focus detection signal increases substantially in proportion to the increase of the magnitude of the defocus amount d. Even in the rear focus state (d>0), the image shift direction between the first focus detection signal and the second focus detection signal is opposite to that in the front focus state, but is similar.

Thus, as the magnitude of the defocus amount increases, the magnitude of the image shift amount between the first and second focus detection signals increases. This embodiment performs a focus detection using an imaging plane phase difference detection method that calculates the defocus amount from the image shift amount between the first and second focus detection signals obtained using the image sensor 107.

Figure 7:
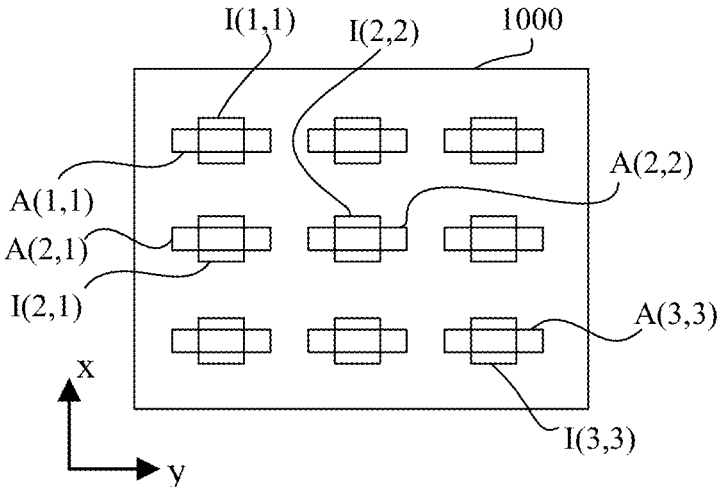
FIG. 7 illustrates a focus detection area according to the first embodiment.

Referring now to FIG. 7, a description will be given of a focus detection area of the image sensor 107 for acquiring the first and second focus detection signals. In FIG. 7, A(n, m) represents a focus detection area that is the n-th area in the x direction and the m-th area in the y direction among the plurality of (three each in the x direction and y direction and totally nine) focus detection areas set in the effective pixel area 1000 of the image sensor 107. First and second focus detection signals are generated from output signals from the plurality of first and second focus detection pixels 201 and 202 included in the focus detection area A(n, m). I(n, m) represents an index for displaying the position of the focus detection area A(n, m) on the display unit 131.

The nine focus detection areas illustrated in FIG. 7 are merely illustrative, and the number, the position, and size of the focus detection areas are not limited. For example, an area of a predetermined range centered on the position designated by the user may be set as the focus detection area.

Figure 8:
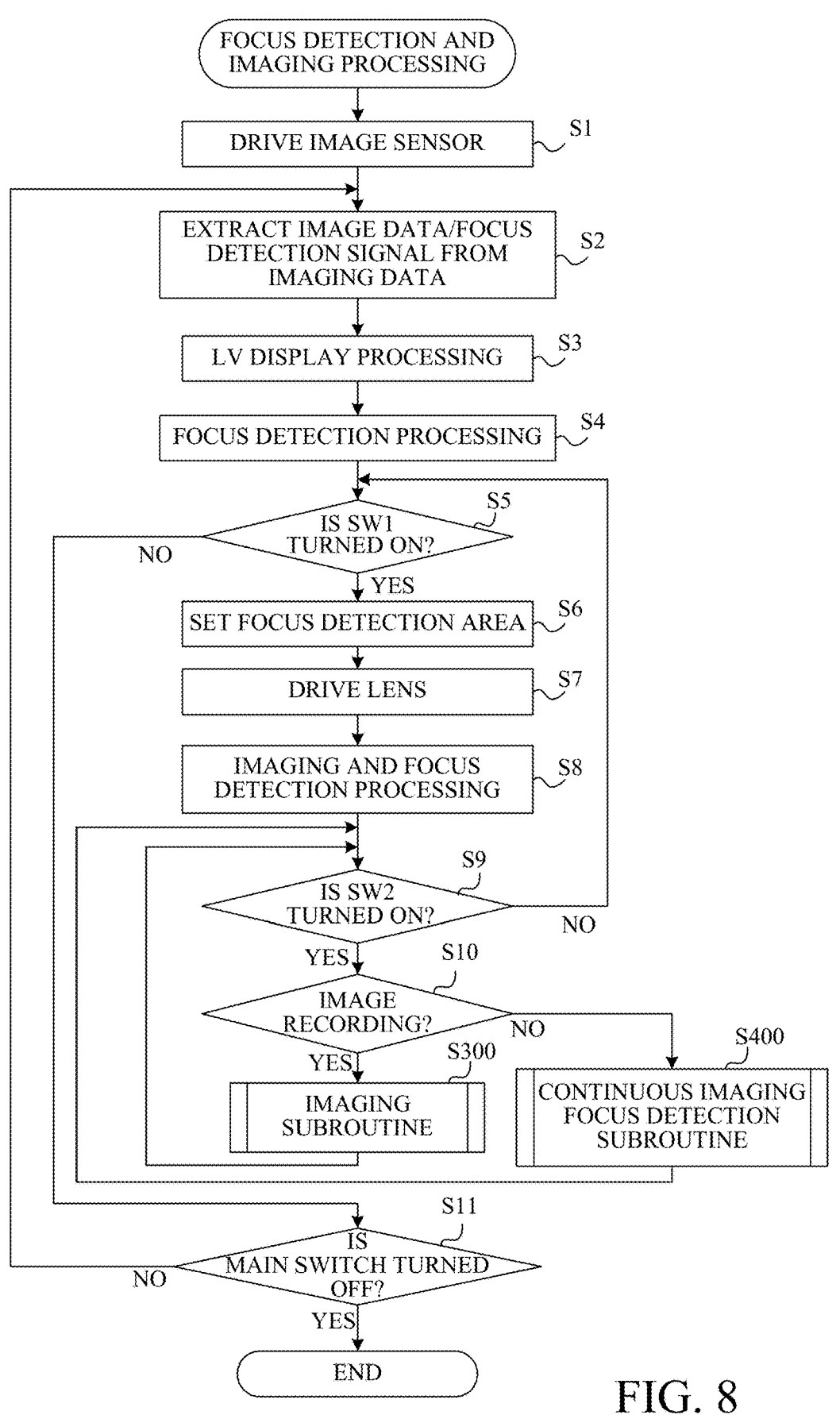
FIG. 8 is a flowchart showing AF/imaging processing in the camera according to the first embodiment.

A flowchart of FIG. 8 illustrates AF/imaging processing (image processing method) that causes the camera 100 according to this embodiment to perform an AF operation and an imaging operation. More specifically, processing is shown from when the camera 100 displays a live-view image on the display unit 131 for the pre-capturing and to when the camera 100 captures a still image. The camera CPU 121 as a computer executes this processing according to a computer program. In the following description, S stands for the step.

Initially, in S1, the camera CPU 121 instructs the image sensor driving circuit 124 to drive the image sensor 107, and acquires imaging data from the image sensor 107.

Next, in S2, the camera CPU 121 acquires the first and second focus detection signals from the plurality of first and second focus detection pixels included in each of the nine focus detection areas illustrated in FIG. 6 among the imaging data obtained in S1. The camera CPU 121 adds the first and second focus detection signals of all effective pixels of the image sensor 107 to generate an imaging signal, and instructs the image processing circuit 125 to perform image processing for the imaging signal (imaging data) to acquire the image data. When the imaging pixel and the first and second focus detection pixels are separately provided, the camera CPU 121 performs complement processing for the focus detection pixels to acquire image data.

Next, in S3, the camera CPU 121 instructs the image processing circuit 125 to generate a live-view image from the image data obtained in S2, and the display unit 131 to display it. The live-view image is a reduced image according to the resolution of the display unit 131, and the user can adjust the imaging composition, the exposure condition, and the like while viewing it.

Next, in S4, the camera CPU 121 calculates the image shift amount between the first and second focus detection signals obtained in each of the nine focus detection areas obtained in S2, and calculates a defocus amount for each focus detection area from the image shift amount.

Next, in S5, the camera CPU 121 determines whether or not a switch Sw1 instructing a start of the imaging preparation operation is turned on by half pressing the release switch included in the operation switch group 132. When the Sw1 is not turned on, the camera CPU 121 proceeds to S11. On the other hand, when the Sw1 is turned on, the camera CPU 121 proceeds to S6, and sets a focus detection area (referred to as an in-focus target area hereinafter) for obtaining an in-focus state. The focus detection area selected by the user may be set as the in-focus target area, or the camera CPU 121 may automatically set the in-focus target area based on the defocus amounts of the nine focus detection areas calculated in S4 and the distance from the imaging range center of those focus detection areas.

The camera CPU 121 proceeds from S6 to S7 and drives the focus lens 105 to a position (in-focus position) for acquiring the in-focus state based on the defocus amount detected in the set in-focus target area.

Next, in S8, the camera CPU 121 performs again the same acquisition processing of imaging data as S1 and the same focus detection processing as S4.

The camera CPU 121 then proceeds to S9, and determines whether or not a switch Sw2 for instructing the start of the imaging operation is turned on by the full pressing operation of the release switch. When the Sw2 is not turned on, the camera CPU 121 returns to S5. On the other hand, when Sw2 is turned on, the flow proceeds to S10 to determine whether or not to record an image. This embodiment switches the image acquisition processing during continuous imaging between the image recording use and the focus detection use. This switching may be performed alternately, or the image acquisition processing for image recording may be performed twice in three times, and the image acquisition processing for the focus detection may be performed once. Thereby, the high-accuracy focus detection can be performed without significantly reducing the number of image captures (the number of captured images) per unit time.

In recording an image in S10, the camera CPU 121 proceeds to S300 to execute an imaging subroutine. Details of the imaging subroutine will be described later. When the imaging subroutine ends, the camera CPU 121 returns to S9 and determines whether Sw2 is turned on or whether or not the continuous imaging is instructed.

When determining that the image is not recorded in S10 or the focus detection is performed, the camera CPU 121 proceeds to S400 and executes the continuous imaging in-focus detection subroutine. Details of the continuous imaging in-focus focus detection subroutine will be described later. When the continuous imaging in-focus focus detection subroutine ends, the camera CPU 121 returns to S9 and determines whether or not the continuous imaging is instructed.

In S11, the camera CPU 121 determines whether or not the main switch included in the operation switch group 132 is turned off. The camera CPU 121 ends this processing when the main switch is turned off, and returns to S2 when the main switch is not turned off.

Referring now to a flowchart in FIG. 9, a description will be given of the imaging subroutine executed by the camera CPU 121 in S300 in FIG. 8.

In S301, the camera CPU 121 performs exposure control processing to determine an imaging condition, such as the shutter speed, the F-number (aperture value), and the imaging sensitivity. This exposure control processing can be performed using the luminance information acquired from image data of a live-view image. Details of the timing of obtaining the image data used for the exposure control processing will be described later.

The camera CPU 121 transmits the determined F-number and shutter speed to the diaphragm/shutter driving circuit 128 to drive the diaphragm/shutter 102. The camera CPU 121 instructs the image sensor 107 to accumulate electric charges during the exposure period through the image sensor driving circuit 124.

The camera CPU 121 that has performed the exposure control processing instructs the image sensor driving circuit 124 to perform all-pixel readout of the imaging signal for capturing a high-pixel still image from the image sensor 107 in S302. The camera CPU 121 instructs the image sensor driving circuit 124 to read one of the first and second focus detection signals from the focus detection area (focus target area) in the image sensor 107. The first or second focus detection signal read out at this time is used to detect the focus state of the image in the image reproduction to be described later. The other focus detection signal can be acquired by subtracting one of the first and second focus detection signals from the imaging signal.

Next, in S303, the camera CPU 121 instructs the image processing circuit 125 to perform defective pixel correction processing for the imaging data read in S302 and A/D-converted.

In S304, the camera CPU 121 instructs the image processing circuit 125 to perform image processing, such as demosaicing (color interpolation) processing, white balance processing, y correction (gradation correction) processing, and color conversion processing, and encoding processing for the imaging data after the defect pixel correction processing.

In S305, the camera CPU 121 stores as an image data file in the memory 133 high-pixel still image data as image data obtained by the image processing and encoding processing in S304, and one of the focus detection signals read out in S302.

Next, in S306, the camera CPU 121 records camera characteristic information as characteristic information of the camera 100 in the memory 133 and the memory in the camera CPU 121 while associating it with the high-pixel still image data recorded in S305. The camera characteristic information includes, for example, information on an imaging condition, such as the F-number, the shutter speed, and the imaging sensitivity, information on image processing performed by the image processing circuit 125, information on the light receiving sensitivity distribution of the imaging pixel and the focus detection pixel on the image sensor 107, information on shielding of imaging light flux in the camera 100, information of the distance from the mounting surface of the imaging optical system in the camera 100 to the image sensor 107, and information on a manufacturing error of the camera 100.

Information on the light receiving sensitivity distribution of the imaging pixel and the focus detection pixel (simply referred to as light receiving sensitivity distribution information hereinafter) is information on the sensitivity of the image sensor 107 according to the distance (position) on the optical axis from the image sensor 107. The light receiving sensitivity distribution information depends on the micro lens 305 and the photoelectric converters 301 and 302, and may be information relating to them. The light receiving sensitivity distribution information may be information of a change in sensitivity to the incident light angle.

Next, in S307, the camera CPU 121 records the lens characteristic information as characteristic information of the imaging optical system in the memory 133 and the memory in the camera CPU 121 in association with the high-pixel still image data recorded in S305. The lens characteristic information includes, for example, information on the exit pupil, information on a frame and the like of the lens barrel for shielding a light flux, information on the focal length and F-number during imaging, information on the aberration of the imaging optical system, and information on a manufacturing error of the imaging optical system, and information of the position (object distance) of the focus lens 105 during imaging. Next, in S308, the camera CPU 121 records image related information as information relating to high-pixel still image data in the memory 133 and the memory in the camera CPU 121. The image related information includes, for example, information on the focus detection operation before imaging, information on the object movement, and information on the focus detection accuracy.

Next, in S309, the camera CPU 121 displays a preview of the captured image on the display unit 131. Thereby, the user can easily confirm the captured image.

When the processing of S309 ends, the camera CPU 121 ends this imaging subroutine and proceeds to S9 in FIG. 8.

Figure 10:
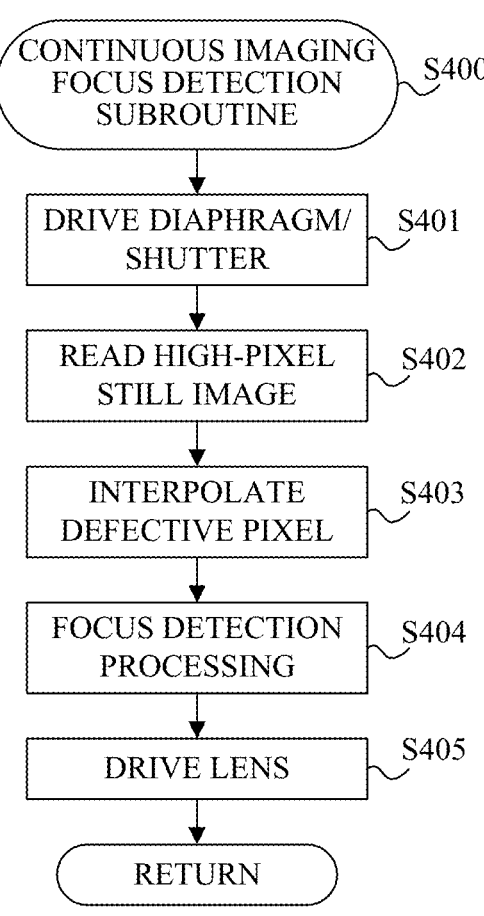
FIG. 10 is a flowchart showing a continuous imaging in-focus detection subroutine in the camera according to the first embodiment.

Referring now to a flowchart in FIG. 10, a description will be given of the continuous imaging focus detection subroutine executed by the camera CPU 121 in S400 of FIG. 7.

Figure 9:
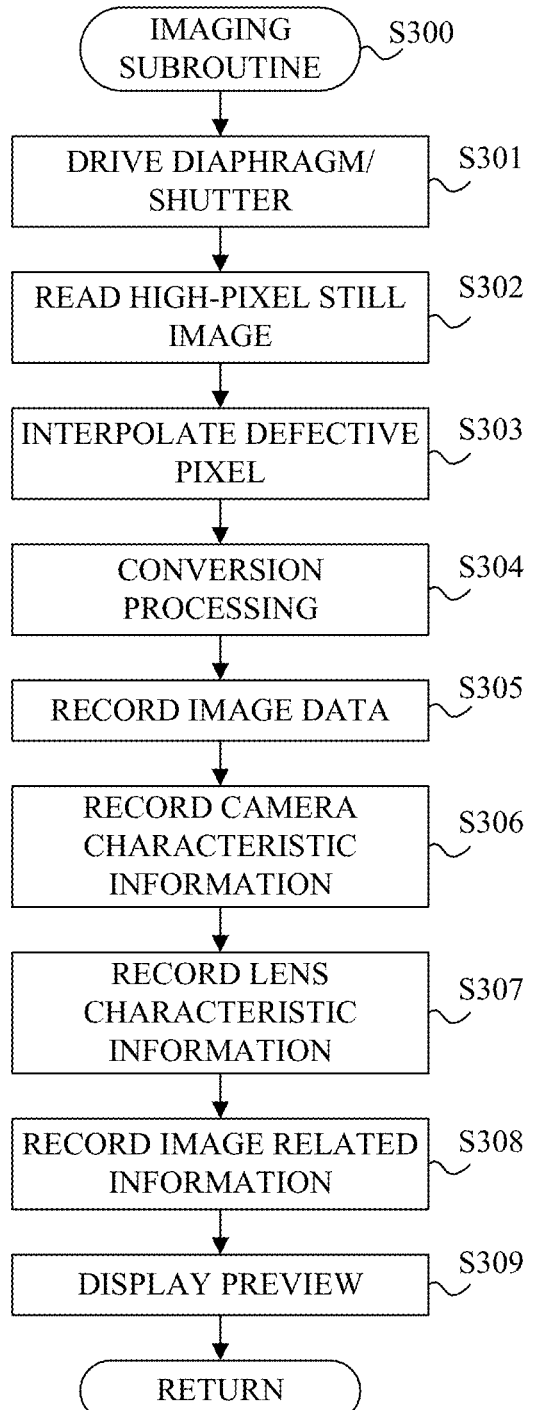
FIG. 9 is a flowchart showing an imaging subroutine of a camera according to the first embodiment.

In S401, the camera CPU 121 performs exposure control processing similar to S301 in FIG. 9, and determines the imaging condition. In order to expose the image sensor 107 for the focus detection, the camera CPU 121 determines the F-number suitable for focus detection, and determines the shutter speed and imaging sensitivity based on the F-number.

The camera CPU 121 transmits the determined F-number and shutter speed to the diaphragm/shutter driving circuit 128 to drive the diaphragm/shutter 102. The camera CPU 121 instructs the image sensor 107 to accumulate electric charges during the exposure period through the image sensor driving circuit 124. Then, the exposure may be performed using a slit rolling shutter or a global electronic shutter that electrically controls the exposure time without driving the diaphragm/shutter 102.

The camera CPU 121 that has performed the exposure control processing instructs the image sensor driving circuit 124 to read all pixels of the imaging signal and one of the first and second focus detection signals from in-focus target area on the image sensor 107 in S402. The focus detection in S4 in FIG. 7 uses a signal obtained by performing processing such as an addition or thinning of the pixel output in the horizontal direction to generate the live-view image, but S402 reads and uses signals from all pixels. Thereby, since it is unnecessary to switch the driving of the image sensor 107 between the imaging and the live-view image generation, a focus detection signal can be obtained without any switching time. If the object has moved from the time selected in S6 in FIG. 8 at this time, the focus target area may be changed using the object detection processing.

Next, in S403, the camera CPU 121 instructs the image processing circuit 125 to perform defective pixel correction processing for the imaging data read out in S402 and A/D-converted.

Next, in S404, the camera CPU 121 calculates the defocus amount in the in-focus target area using the first and second focus detection signals obtained in the in-focus target area.

Next, in S405, the camera CPU 121 drives the focus lens 105 to the in-focus position according to the defocus amount of the in-focus target area. Thereafter, the camera CPU 121 ends the continuous imaging focus detection subroutine, and proceeds to S9 in FIG. 7.

Figure 11:
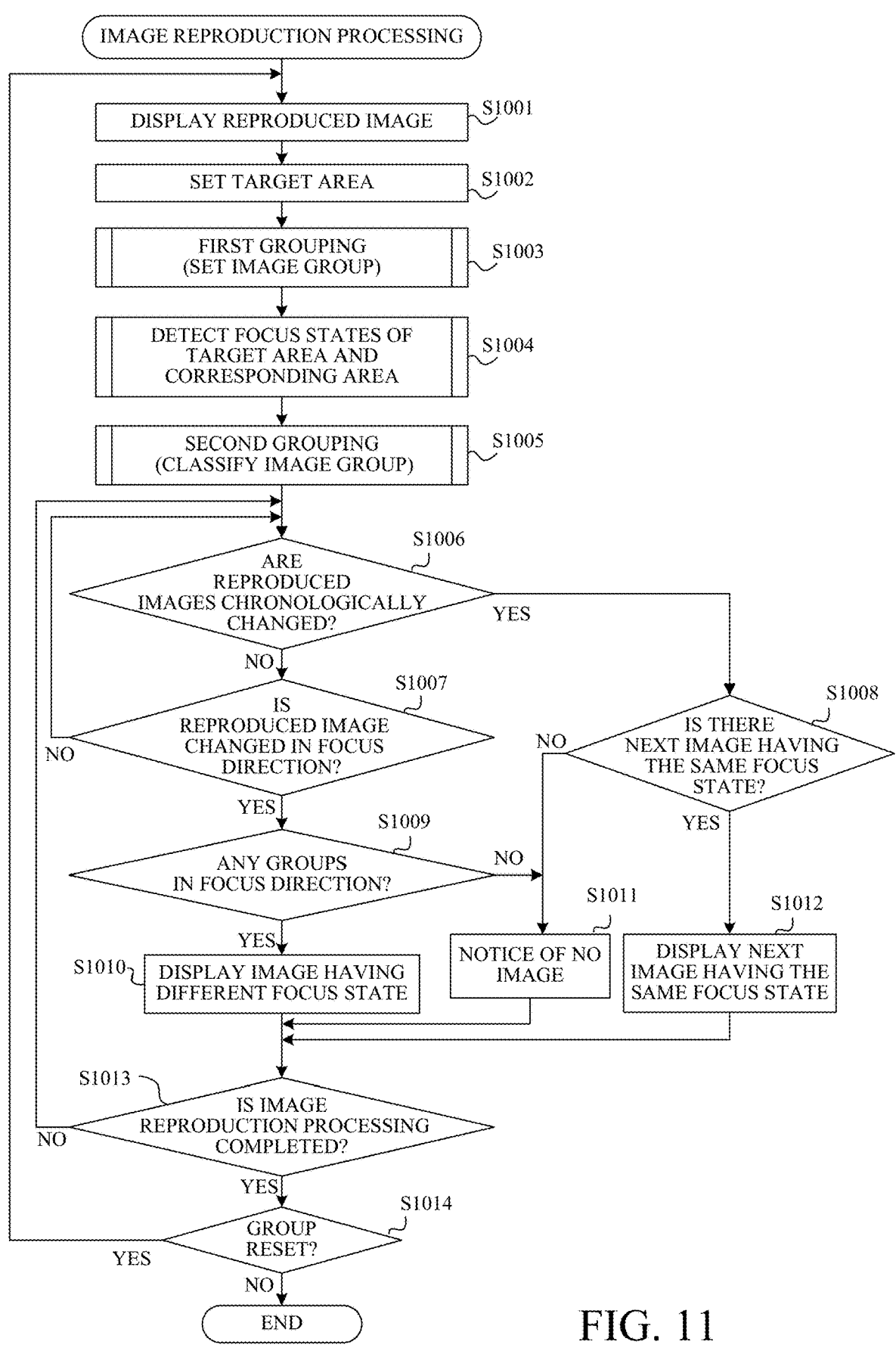
FIG. 11 is a flowchart showing image reproduction processing in the camera according to the first embodiment.

A flowchart in FIG. 11 illustrates the image reproduction processing performed by the camera CPU 121. At the outset of this processing, assume that a plurality of captured images recorded in the memory 133 are displayed on the display unit 131.

Initially, in S1001, the camera CPU 121 selects one of the plurality of thumbnail images displayed on the display unit 131 according to the user's operation, and reproduces and displays a captured image corresponding to the selected thumbnail image on the display unit 131.

Next, in S1002, the camera CPU 121 sets a target area in the captured image (referred to as a reproduced image hereinafter) reproduced and displayed in S1001 in accordance with the user's operation.

Figures 12A, 12B:
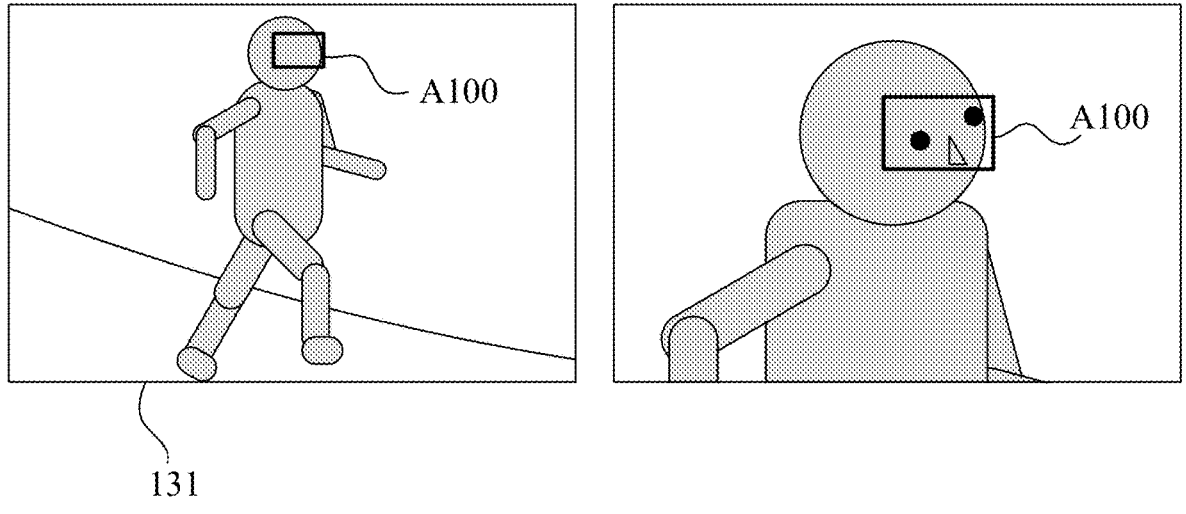
FIGS. 12A and 12B explain a method of setting a target area from a display image according to the first embodiment.

Referring now to FIGS. 12A and 12B, a description will be given of a method of setting a target area (first evaluation area) from the reproduced image. FIG. 12A illustrates the entire reproduced image displayed on the display unit 131, and FIG. 12B illustrates enlarged part of the reproduced image displayed on the display unit 131.

The user designates the position and size of a target area A100 in the reproduced image for checking the focus state through the operation of the operation switch group 132 or the touch operation when the display unit 131 is a touch panel. The camera CPU 121 sets a target area in the reproduced image according to the designation. The operation switch group 132, the display unit 131 as a touch panel, and the camera CPU 121 correspond to an area setter. The target area A100 may be set in the state illustrated in FIG. 12A that illustrates the entire reproduced image or in the state illustrated in FIG. 12B that illustrates its enlarged part.

Next, in S1003, the camera CPU 121 serving as an image group setter sets an image group including a plurality of mutually relevant captured images including the reproduced image based on the target area set in S1002. In other words, the first grouping is performed. Then, the camera CPU 121 as an area detector determines (detects) whether an area relevant (or similar) to the target area set by the user is included in a plurality of other captured image (second image) having an imaging time close to that of the repro- duced image (first image). When there is a captured image including an area similar to the target area, the camera CPU 121 recognizes the similar area as a corresponding area corresponding to the target area. Then, the camera CPU 121 sets the image group including the plurality of other cap- tured images having the reproduced image and the corre- sponding area. The image group is a target of the second grouping described later. The setting method of the image group will be described in detail later. While the correspond- ing area "relevant to" the target area is expressed as "simi- lar" in this embodiment, a relevant area other than similarity may be used for the corresponding area.

Next, in S1004, the camera CPU 121 serving as a focus state acquirer acquires (detects) the focus state of the target area and the corresponding area in the image group set in S1003. In other words, the camera CPU 121 detects the focus state for each of the target area and the corresponding area, and determines the "focus state," the "front focus state," and the "rear focus state." The focus state includes the defocus amount and the defocus direction.

The camera CPU 121 serving as the classification pro- cessor proceeds to S1005, and performs classification pro- cessing that classifies the plurality of captured images (re- produced image and other captured images) included in the image group set in the first grouping into a plurality of groups according to the detection result of the focus state in S1004. This classification processing is called second group- ing and will be described in detail later.

Next, in S1006, the camera CPU 121 determines whether or not the user has performed an operation of chronologi- cally changing the reproduced image using the operation switch group 132. If the user has not performed this opera- tion, the camera CPU 121 proceeds to S1007, and if the user has performed the operation, the camera CPU 121 proceeds to S1008.

In S1007, the camera CPU 121 determines whether or not the user has performed the operation of changing the repro- duced image in the focus direction with the operation switch group 132. If the user has not performed this operation, the camera CPU 121 returns to S1006 and waits for the user operation. If the user has performed this operation, the camera CPU 121 proceeds to S1009.

Figure 13:
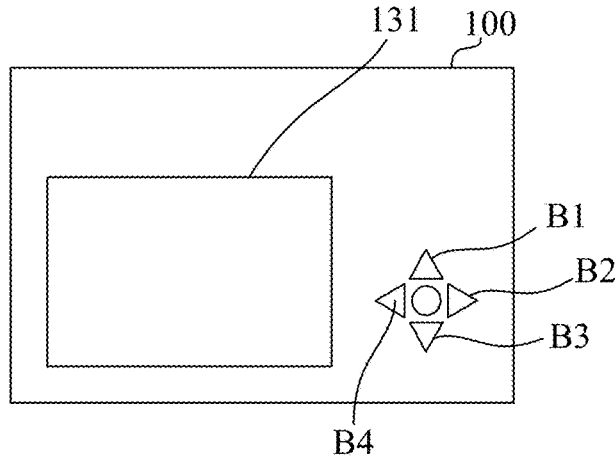
FIG. 13 is a rear view of the camera according to the first embodiment.

Referring now to FIG. 13, a description will be given of an example of the operation switch group 132 which the user operates in S1006 and S1007. FIG. 13 illustrates rear view of the camera 100. The display unit 131 displays the reproduced image. On the back of the camera 100, operation buttons B1 to B4 are arranged in a cross shape.

The user operation of chronologically changing the repro- duced image in S1006 is performed for the operation buttons B2 and B4 serving as the first display image changer. For example, when the operation button B2 is pressed, a cap- tured image acquired temporally posterior to the current reproduced image is newly displayed as a reproduction image, and when the operation button B4 is pressed, the captured image acquired temporally prior to the current reproduced image is newly displayed as a reproduced image.

A user operation to change the reproduced image to the focus direction in S1007 is performed for the operation buttons B1 and B3 serving as a second display image changer. For example, when the operation button B1 is pressed, a captured image that is focused on the infinity side of the current reproduced image is newly displayed as a reproduced image, and when the operation button B3 is pressed, a captured image that is focused on the short distance (close or near) side of the current reproduced image is newly displayed as a reproduced image.

Instead of the cross-shaped operation buttons B1 to B4, a user operation of changing a reproduced image may be performed by a rotation operation of a dial. In this case, a dial for chronologically changing the reproduced image and a dial for changing the reproduced image in the focus direction may be separately provided. Alternatively, the dial and the operation button may be combined to chronologi- cally change the reproduced image and focus direction. Furthermore, instead of the operation switch group 132, the chronological order and the focus direction may be changed by a touch operation (such as a swipe operation in the horizontal direction and the vertical direction) on the touch panel of the display unit 131.

In S1008, the camera CPU 121 determines whether or not there is a chronologically next captured image that can be changed as a reproduced image according to the user's operation in S1006 in the group of captured images with the same focus state classified in S1005 (referred to as a next chronological image hereinafter). If the chronologically next image does not exist, the camera CPU 121 proceeds to S1011 and instructs the display unit 131 to display no next chronological image. More specifically, a notice of no next chronological image may be informed by characters, or through the fact that the reproduced image is not changed even with the user operation (operation buttons B2 and B4 or touch panel operation). On the other hand, if there is a next chronological image, the camera CPU 121 proceeds to S1012 and displays the next chronological image on the display unit 131. The camera CPU 121 that has completed S1011 or S1012 proceeds to S1013.

In S1009, the camera CPU 121 determines whether or not there is a group of captured images having different focus states in the focus direction corresponding to the user operation in S1007 for the current reproduced image. For example, when the current reproduced image is included in the "in-focus state" group and the user operation corresponds to the front focus direction, it is determined whether or not the captured image exists in the "front focus state" group. When the current reproduced image is included in the "front focus state" group and the user operation corresponds to the front focus direction, it is determined whether or not the captured image exists in the "more frontward focus state" group. If there is a group of captured images having different focus states corresponding to the user operation, the flow proceeds to S1010. If not, the flow proceeds to S1011 to display on the display unit 131 that no next captured image exists in the focus direction.

In S1010, the camera CPU 121 displays the next captured image in the focus direction corresponding to the user's operation in S1007, which is the chronologically closest to the current reproduced image on the display unit 131 as a new reproduced image.

The camera CPU 121 thus having completed S1010 or S1011 proceeds to S1013.

In S1013, the camera CPU 121 determines whether to end this image reproduction processing. If the user powers off or instructs to shift from the image reproduction state to the imaging state, the camera CPU 121 proceeds to S1014 to end the image reproduction processing. In resetting the grouping of the captured images described in S1014 to be described later, the camera CPU 121 determines in S1013 that the image reproduction processing is to end, and proceeds to S1014. On the other hand, in continuing this image reproduction processing rather than ending, the camera CPU 121 returns to S1006 and waits for the user operation.

In S1014, the camera CPU 121 determines whether the processing relating to grouping of the captured images performed in S1003 or S1005 is to be again performed. When the chronologically prior or posterior captured image is to be added or deleted, when the number of groups into which the captured images are classified according to the focus state, the threshold for determining the focus state, etc. is to be changed, when the target area is to be reset, the flow returns to S1001. On the other hand, when the grouping of the captured images is not reset, the camera CPU 121 ends this image reproduction processing.

In this embodiment, the area used to confirm the focus state in the captured image (reproduced image) is made variable by resetting the target area as described in S1014. Thus, the focus state can be confirmed in the target area (in-focus target area) set during imaging but also in the target area later desired by the user. Moreover, the focus state can be confirmed in a plurality of target areas for a single captured image. For example, in a captured image of a person who has got on a vehicle, a target area can be set not only to the face of the person but also to the vehicle.

Figure 14:
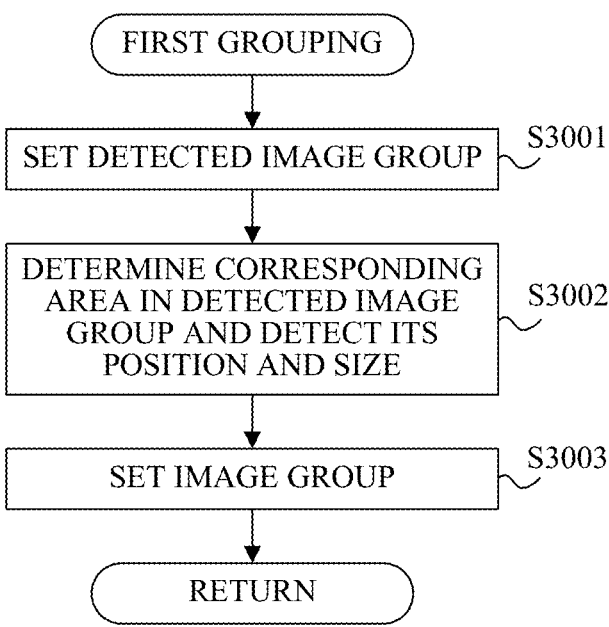
FIG. 14 is a flowchart showing a first grouping subroutine in the camera according to the first embodiment.

Referring now to a flowchart in FIG. 14, a description will be given of a first grouping subroutine performed by the camera CPU 121 in S1003 of FIG. 11. In this subroutine, the camera CPU 121 sets mutually related image groups based on the target area set in S1002.

In S3001, the camera CPU 121 sets a detected image group. Although there are a variety of methods for setting the detected image group, a plurality of captured images having corresponding areas corresponding to the target area set in S1002 are set as detected image groups. For example, if a plurality of captured images having the target area and the corresponding area set in S1002 are obtained by continuous imaging, a plurality of consecutively captured images (continuously captured image group) having the corresponding areas are set to a detected image group.

A plurality of captured images may be set to the detected image group, with the imaging time having a time within a predetermined range (such as 10 minutes) from the imaging time of the captured image having the target area set in S1002. The detected image group may be set according to the following status of focusing during the continuous imaging and the exposure control situation. For example, a plurality of captured images acquired by imaging while the so-called servo AF is performed with a servo control of focusing may be set as a detected image group. Information provided to a plurality of continuously captured images corresponds to continuous imaging information in order to identify that recording has been made by a single image recording instruction, such as the focusing following status during the continuous imaging and the exposure control status.

Next, in S3002, the camera CPU 121 determines whether or not each captured image included in the detected image group has the corresponding area. The position and size of the corresponding area in the captured image are detected in the captured image having the corresponding area. Template matching is used for this determination and detection. An object model (template) in the template matching is set to the target area, and a pixel pattern of the target area is treated as a feature amount.

The feature amount T(i, j) is expressed by the expression (2), where a coordinate in the template is (i, j), the number of horizontal pixels is W, and the number of vertical pixels is H.

$$T(i,j)=\{T(0,0),T(1,0),\ldots,T(W-1,H-1)\}\quad(2)$$

In a captured image used to search for a corresponding area, a range (search range) in which matching is performed is set to the entire area of the captured image. The coordinate in the search range is expressed by (x, y). A partial area for acquiring the evaluation value of matching is set, and the luminance signal of each partial area is set to the feature amount S(i, j) similar to the feature amount of the template. The feature amount S(i, j) is expressed by the expression (3), where the coordinate in the partial area is (i, j), the number of horizontal pixels is W, and the number of vertical pixels is H.

$$S(i,j)=\{S(0,0),S(1,0),\ldots,S(W-1,H-1)\}\quad(3)$$

As a calculation method for evaluating the similarity between the template and the partial area, a difference absolute sum, so-called SAD (Sum of Absolute Difference) value is used. The SAD value is calculated by the expression (4).

$$V(x, y) = \sum\nolimits_{y=0}^{H-1} \sum\nolimits_{x=0}^{W-1} |T(i, j) - S(i, j)|\quad(4)$$

The SAD value V(x, y) is calculated by sequentially shifting the partial area by one pixel in order from the upper left of the entire area in the captured image as the search range. The coordinate (x, y) at which the calculated V(x, y) has the minimum value indicates the position most similar to the template. In other words, the position indicating the minimum value is the position where the object to be followed is likely to exist in the search range. While one-dimensional information of a luminance signal is illustratively used as a feature amount, three-dimensional information such as the brightness, hue, and chroma signals may be treated as a feature amount. This embodiment uses the SAD value as the matching evaluation value, but may use a value obtained by a different calculation method such as a normalized mutual correlation or so-called NCC (Normalized Correlation Coefficient).

If the SAD value V(x, y) at the most similar position is larger than a predetermined value, it is determined that the captured image of the detection target does not have a corresponding area. Thereby, the detected image group set in S3001 can be reset.

Next, in S3003, the camera CPU 121 sets a captured image having a corresponding area among the reproduced image and the detected image group as an image group, and provides information on the position and size (range) of the corresponding area in each captured image of the image group. The camera CPU 121 that has completed S3003 ends the processing of this subroutine.

Referring now to a flowchart in FIG. 15, a description will be given of a subroutine in which the camera CPU 121 detects the focus states of the target and corresponding areas in S1004 in FIG. 11. In this subroutine, the camera CPU 121 detects the focus state of the target area or the corresponding area in each captured image included in the image group set in S1003.

In S4001, the camera CPU 121 detects a phase difference (image shift amount) of a target or corresponding area as the first evaluation area in each captured image included in the image group. As described in S302 described above, the camera 100 according to this embodiment records one of the first and second focus detection signals in recording a normal captured image. The camera CPU 121 detects an image shift amount between one recorded focus detection signal and the other focus detection signal obtained by subtracting the one focus detection signal from the imaging signal.

The image shift amount detection performed in S4001 is the same as the image shift amount detection and calculation method performed in the display state of a live-view image (live-view state), but the pixel pitch of the focus detection signal used is different. A signal obtained through processing, such as adding or thinning of a pixel output in the horizontal direction is used to generate a live-view image, but S4001 obtains a signal of a finer pixel pitch since it uses an imaging signal in which all pixels are read out so as to record a high-pixel still image. Thus, S4001 can detect a more accurate image shift amount.

Since the focus detection timing is different from the imaging timing for recording in the live-view state, the focus state is unnecessarily equal at these timings. Although the focus state at the imaging timing can be predicted from the focus detection result in the live-view state, it is difficult to eliminate the error. On the other hand, the image shift amount detection using the imaging signal of the captured image for recording including information on positions of the plurality of viewpoints and visual line directions from the viewpoints (information on the plurality of viewpoints: viewpoint information) can detect the focus state of the captured image for recording without any time lags.

In S4001, the camera CPU 121 converts the image shift amount detected in each captured image into the defocus amount and the object distance using the camera characteristic information (acquired in S306) and lens characteristic information (acquired in S307) when each captured image is acquired. In converting into the defocus amount, the light receiving sensitivity distribution information based on the light flux range information is calculated using the light flux range information (information on the exit pupil position on the optical axis, the F-number and the frame of the imaging optical system) and the light receiving sensitivity distribution information of the focus detection pixel. The camera CPU 121 calculates a representative value (representative coordinate) of the pair on the coordinate indicating the light receiving sensitivity distribution information based on the light reception sensitivity distribution information of the pair of focus detection pixels. Then, L/W is calculated using the distance W between the pair of representative values and the distance L from the image sensor 107 to the position on the optical axis indicating the light receiving sensitivity distribution information, and the defocus amount is calculated by multiplying the detected image shift amount by L/W. The pair of representative values may be the center of gravity coordinate of the light receiving sensitivity distribution or the center coordinate in the range of the light receiving sensitivity distribution.

A conversion coefficient corresponding to the F-number and the exit pupil distance of the imaging optical system may be stored in acquiring the image for recording, and the defocus amount may be calculated by multiplying the image shift amount by it.

In converting the defocus amount into the distance information, an imaging magnification (lateral magnification) B is calculated from the object distance information D and the focal length information f associated with the position of the focus lens 105 during imaging, and the focus amount is multiplied by $B^2$. Thereby, the defocus amount (distance information) at the object distance can be calculated. The object distance is obtained by adding and subtracting the defocus amount at the object distance for the object distance information D.

Next, in S4002, the camera CPU 121 serving as a reliability determiner determines whether or not the reliability of the defocus amounts is high obtained from the target and corresponding areas (first evaluation area) of all captured images included in the image group in S4001.

In this embodiment, since a plurality of captured images included in the image group are obtained by continuous imaging, the position (image height) of the object changes largely depending on their imaging timing, or the lens state (such as the focus lens position and the F-number) may change significantly. In this case, the signal amounts in the target and corresponding areas may become insufficient to stably detect the image shift amount. Thus, the camera CPU 121 determines the reliability of the defocus amount using the magnitude of the minimum value of the correlation amount between the first and second focus detection signals in detecting the image shift amount in each captured image and the magnitude of the change in the correlation amount near the minimum value. More specifically, the camera CPU 121 determines that the reliability is high when the minimum value of the correlation amount is small or when the change of the correlation amount near the minimum value is large.

When an image group includes a captured image with low reliability of the defocus amount, the camera CPU 121 sets a second evaluation area that is different at least in part from the first evaluation area as the target and corresponding areas for each captured image in the image group. Then, the camera CPU 121 calculates the defocus amount in the second evaluation area.

Although S4002 determines the reliability of the defocus amount in the target area and the corresponding area based on the magnitude of the correlation amount and the magnitude of the change in the correlation amount, another determination method may be used. For example, using contrast information of the target and corresponding areas and information on the signal amount of a predetermined spatial frequency, this embodiment may determine that the reliability is low when the contrast is low or the signal amount is small.

The camera CPU 121 proceeds to S4003 if it has determined in S4002 that the reliability of the defocus amount in each of the target and corresponding areas (first evaluation area) is low.

Figure 16:
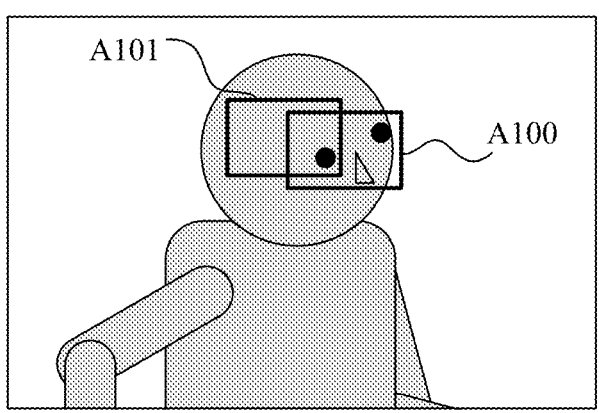
FIG. 16 explains a second evaluation area according to the first embodiment.

In S4003, the camera CPU 121 sets a second evaluation area near the target area (first evaluation area) of the reproduced image. In this case, the camera CPU 121 sets the second evaluation area so that the detection of the defocus amount can be expected more accurately than the first evaluation area. FIG. 16 illustrates a second evaluation area A101 that is set so that at least part is different from the target area A100 illustrated in FIG. 12B.

In FIG. 16, a higher contrast signal and a more accurate defocus amount can be detected by setting the second evaluation area A101 including the hairline area for the target area A100 centered on the eye area of the object. A plurality of second evaluation areas may be set. By calculating the average value of the defocus amounts obtained from the plurality of second evaluation areas, the defocus amount can be detected more stably and accurately even when the inclination of the object changes or the like.

Next, in S4004, similar to S3002, the camera CPU 121 determines whether or not the plurality of captured images other than the reproduced image included in the image group have a corresponding area similar to the second evaluation area, and detects, if so, the position and size of the corresponding area.

In S4005, the camera CPU 121 detects (calculates) the image shift amounts, the defocus amounts, and the object distances in the second evaluation area and the corresponding area, similar to S4001.

In S4006, the camera CPU 121 determines whether the reliability of the defocus amount obtained in each of the second evaluation area and the corresponding area is high, similar to S4002. If it is determined that the reliability of the defocus amount obtained in the second evaluation area or the corresponding area is low, the camera CPU 121 returns to S4003 and sets the second evaluation area again. The camera CPU 121 may maintain the second evaluation area, and set a third evaluation area that is at least partially different from the second evaluation area.

On the other hand, the camera CPU 121 proceeds to S4007 when determining that the reliability of the defocus amount obtained in the second evaluation area in S4006 is high. In S4007, the camera CPU 121 updates the defocus amount and the object distance obtained in the first evaluation area in S4001 with the defocus amount and the object distance obtained in the second evaluation area.

Figure 17:
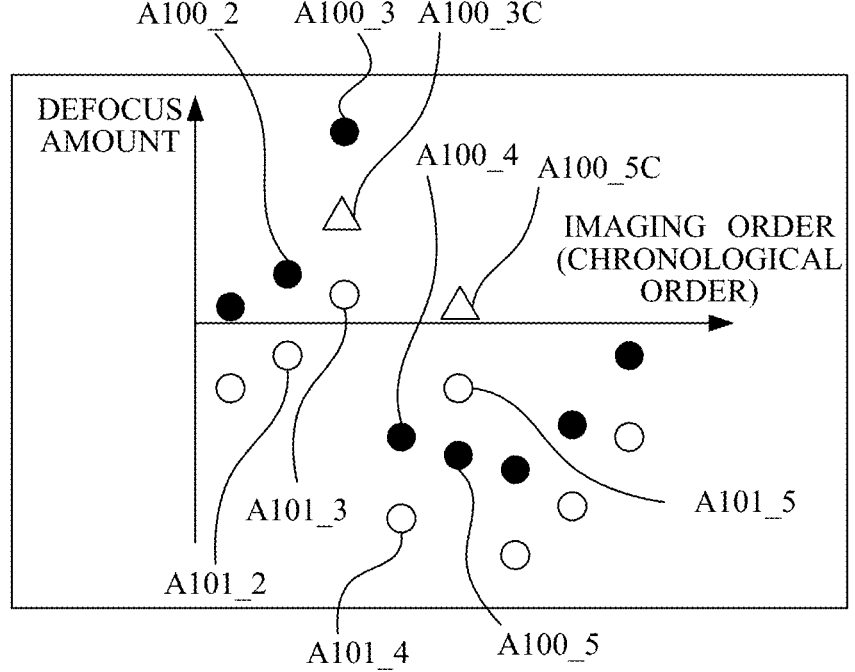
FIG. 17 explains a method of updating a detection result according to the first embodiment where the reliability of the result obtained from the first evaluation area is low.

Referring now to FIG. 17, a description will be given of a method of updating the defocus amount. FIG. 17 illustrates the defocus amounts (A100_2 to A100_5) obtained in the first evaluation area A100 and the defocus amounts (A101_2 to A101_5) obtained in the second evaluation area A101 in chronological order of imaging. An abscissa axis represents the order of imaging time, and an ordinate axis represents the detected defocus amount. Black dots A100_2 to A100_5 in the figure represent the defocus amounts obtained in the first evaluation area A100, and white dots A101_2 to A101_5 represent the defocus amounts obtained in the second evaluation area A101.

A description will now be given of an illustrative method of updating the defocus amount when the reliability of the defocus amount A100_3 obtained from the first evaluation area is low. The defocus amounts A100_2 and A100_4 temporally prior and posterior to the defocus amount A100_3 are both highly reliable. The defocus amounts A101_2, A101_3, and A101_4 obtained in the second evaluation area are also highly reliable. Then, the updated defocus amount A100_3C is calculated by the following expression (5) for the defocus amount A100_3.

$$A100\_3C = A101\_3 + (A100\_2 + A100\_4 - A101\_2 - A101\_4)/2 \tag{5}$$

In the expression (5), the highly reliable defocus amount A101_3 is offset by the average value of the differences between the defocus amounts obtained in the first and second evaluation areas A100 and A101 prior and posterior to it. Then, the low reliable defocus amount A100_3 is updated with the offset defocus amount to obtain the defocus amount A100_3C having a high reliability to a certain extent.

FIG. 17 illustrates that the reliability of the defocus amount A100_5 is low. As described in the expression (5), the defocus amount is updated using the defocus amount obtained temporally prior and posterior to the defocus amount A100_5 so as to obtain the defocus amount A100_5C that is reliable to some extent.

This embodiment updates the low reliable evaluation result using a difference between the evaluation results (defocus amounts) obtained from the two evaluation areas, but may obtain the difference based on the evaluation results acquired from more evaluation areas. If the object status (distance or size) significantly changes during continuous imaging, the difference between the defocus amounts obtained in the two evaluation areas also significantly changes, so the difference may be obtained between the defocus amounts temporally closer to each other. While the update of the defocus amount has been described in FIG. 17, the object distance may be updated. Since the difference in object distance as the evaluation result obtained in the two evaluation areas is not easily influenced by the change in the object status during continuous imaging, the object distance can be more accurately updated.

This embodiment describes the second evaluation area set regardless of the size of the target area (the first evaluation area), but may set the second evaluation area according to the size of the target area. When the target area is small, the object is small and thus an edge having a high contrast is likely to exist in the evaluation area. On the other hand, when the target area is large, the object is large and thus an edge having a high contrast is less likely to exist in the evaluation area. Thus, by setting the second evaluation area only when the attention area is large, the defocus amount can be detected with high accuracy while the calculation amount relating to the second evaluation area is reduced.

After S4007, the camera CPU 121 proceeds to S4008 to tag with each captured image and store the imaging condition, such as a focus state of each captured image included in the image group and the F-number in capturing each image, the object distance, and depth related information described later. Then, this subroutine ends.

Referring now to a flowchart in FIG. 18, a description will be given of a second grouping subroutine performed by the camera CPU 121 in S1005 in FIG. 11. In this subroutine, the camera CPU 121 classifies the image group set in S1003 based on the focus state detected in S1004.

In S5001, the camera CPU 121 acquires the depth related information from a plurality of captured images included in the image group. The depth related information is information of a permissible circle of confusion diameter and an F-number in acquiring each captured image, which information is used to calculate the depth of focus. In general, the permissible circle of confusion allows a viewer to recognize a blur larger than that diameter depending on the image size and the viewing distance. This embodiment sets c to the permissible circle of confusion diameter according to the image size. Assume that F represents the F-number. Then, the depth of focus is represented by ±εF. The camera CPU 121 calculates the depth of focus in each captured image.

Next, in S5002, the camera CPU 121 sets a threshold (referred to as a determination threshold hereinafter) used to determine the focus state. More specifically, the camera CPU 121 sets to a determination threshold (predetermined defocus amount) a determination threshold for the front focus direction (first threshold that is negative) Th1=−εF/2 and a determination threshold for the rear focus direction (second threshold that is positive) Th2=+εF/2. The determination threshold may be changed according to the user's operation in accordance with the focus state of the image group. The method of changing the determination threshold will be described later.

Next, in S5003, the camera CPU 121 sets a captured image (referred to as a determination image hereinafter) used to determine the focus state from the image group. Then, when the determination image is set in advance, the camera CPU 121 sets the next captured image in chronological order of imaging time as a new determination image. On the other hand, when the determination image is not set in advance, the camera CPU 121 sets, as the determination image, one of the plurality of captured images included in the image group which has the earliest imaging time.

Next, in S5004, the camera CPU 121 determines whether the defocus amount (focus state) of the target or corresponding area of the determination image is smaller than the determination threshold Th1. Where the defocus amount is smaller than the determination threshold Th1, the camera CPU 121 proceeds to S5006 and determines that the determination image belongs to the first group (front focus group) Gr. 1.

On the other hand, if the defocus amount is equal to or larger than the determination threshold Th1, the camera CPU 121 proceeds to S5005 and determines whether the defocus amount of the target area is smaller than the determination threshold Th2. If the defocus amount is smaller than the determination threshold Th2, the camera CPU 121 proceeds to S5007 and determines that the determination image belongs to the second group (nearly in-focus group) Gr. 2. If the defocus amount of the target area is equal to or larger than the determination threshold Th2, the camera CPU 121 proceeds to S5008 and determines that the determination image belongs to a third group (rear focus group) Gr. 3.

The camera CPU 121 that has completed any of S5006, S5007, and S5008 proceeds to S5009, and determines whether or not the focus states have been completely determined for all captured images included in the image group.

If the camera CPU 121 has not determined the focus states of all the captured images, the flow returns to S5003 to make a determination on the next captured image, and when the focus states of all the captured images have been completely determined, this subroutine ends.

In the image group set using the continuous imaging information, the presence or absence of the target area, and the imaging time, this embodiment detects the corresponding area of another captured image corresponding to the target area in a single captured image, and detects the defocus amounts of the target and corresponding areas. Then, this embodiment determines the focus state of each captured image based on the defocus amount (size and direction) and the depth of focus detected in each captured image. Thereby, this embodiment can change the reproduced images in chronological order in the image reproduction as well as changing the focus state.

This embodiment groups captured images according to the focus state on the assumption that the focus state of the target area or the corresponding area scatters due to the scattering focusing accuracy during imaging. Where the focusing accuracy significantly scatters such as when the object drastically moves during imaging or when the object has a low contrast, grouping according to the focus state effectively works. However, where the focusing accuracy is high, it is presumed that the focus state of the target area or the corresponding area does not scatter so much that the focus state can be changed. Even in that case, there may be a difference between the target area for which the user desires to obtain the in-focus state and the focus detection area set in the camera 100, and this difference causes the target area that is not in-focus to be stably obtained.

Then, if the user would like to select a focus state after imaging, a plurality of captured images with different focus states may be acquired intentionally without expecting the focusing accuracy to scatter. For example, by continuously capturing images in the front focus state, in the in-focus state, and in the rear focus state according to the depth of focus, a plurality of captured images with different focus states can be acquired.

This embodiment performs the first grouping in S1003 after the target area is set in S1002 in FIG. 11. Alternatively, after the first grouping, a captured image may be selected and displayed which can be easily set in the target area, and the target area may be set to the selected captured image. In this case, although the first grouping cannot be based on the presence or absence of the target area, but can be based on the imaging time, whether it is the continuously captured image, and the like. A captured image that makes the target area to be easily set may be an image having a shallow depth of focus, such as an image with a larger object, an image closer to the in-focus object, and an image obtained by imaging with a wider aperture. Thereby, the target area can be set using the captured image that facilitates the setting of the target area and the confirmation of the focus state.

Next follows a specific description of a method for determining each captured image in the image group and a method of selecting the reproduced image in the processing described above.

Figure 19:
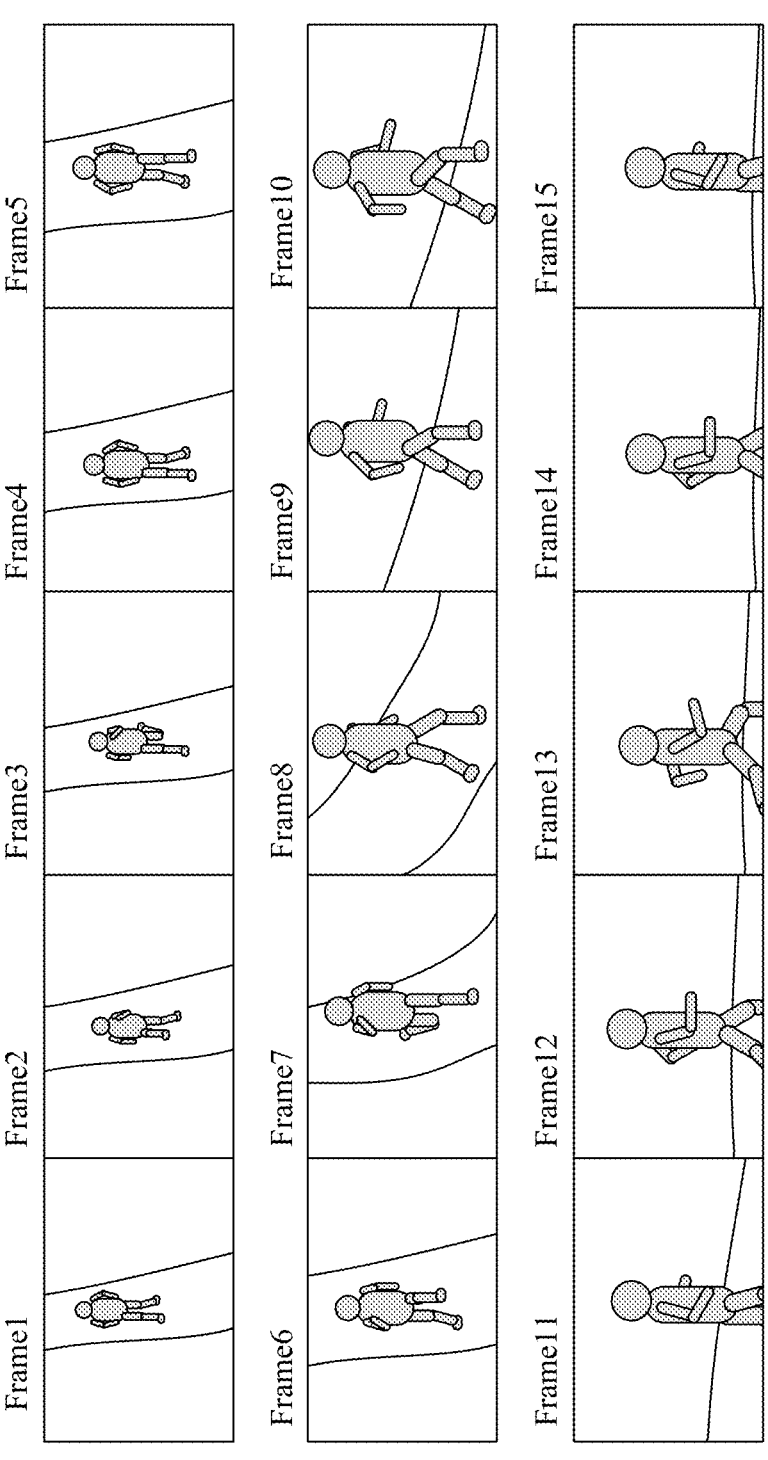
FIG. 19 explains an image group that has received the first grouping according to the first embodiment.

FIG. 19 illustrates an image group obtained as a result of the first grouping as a captured image including a corresponding area similar to the target area set as illustrated in FIG. 12A among a plurality of captured images obtained by continuous imaging. Images Frame 1 to Frame 15 show captured images in order from the oldest imaging time. The captured image illustrated in FIG. 12A corresponds to Frame 10. The captured image Frame 10 is an image suitable to set the target area, since the depth of focus is shallow because the object distance is short, and shows not only the face but also the entire body as the object.

Figure 20:
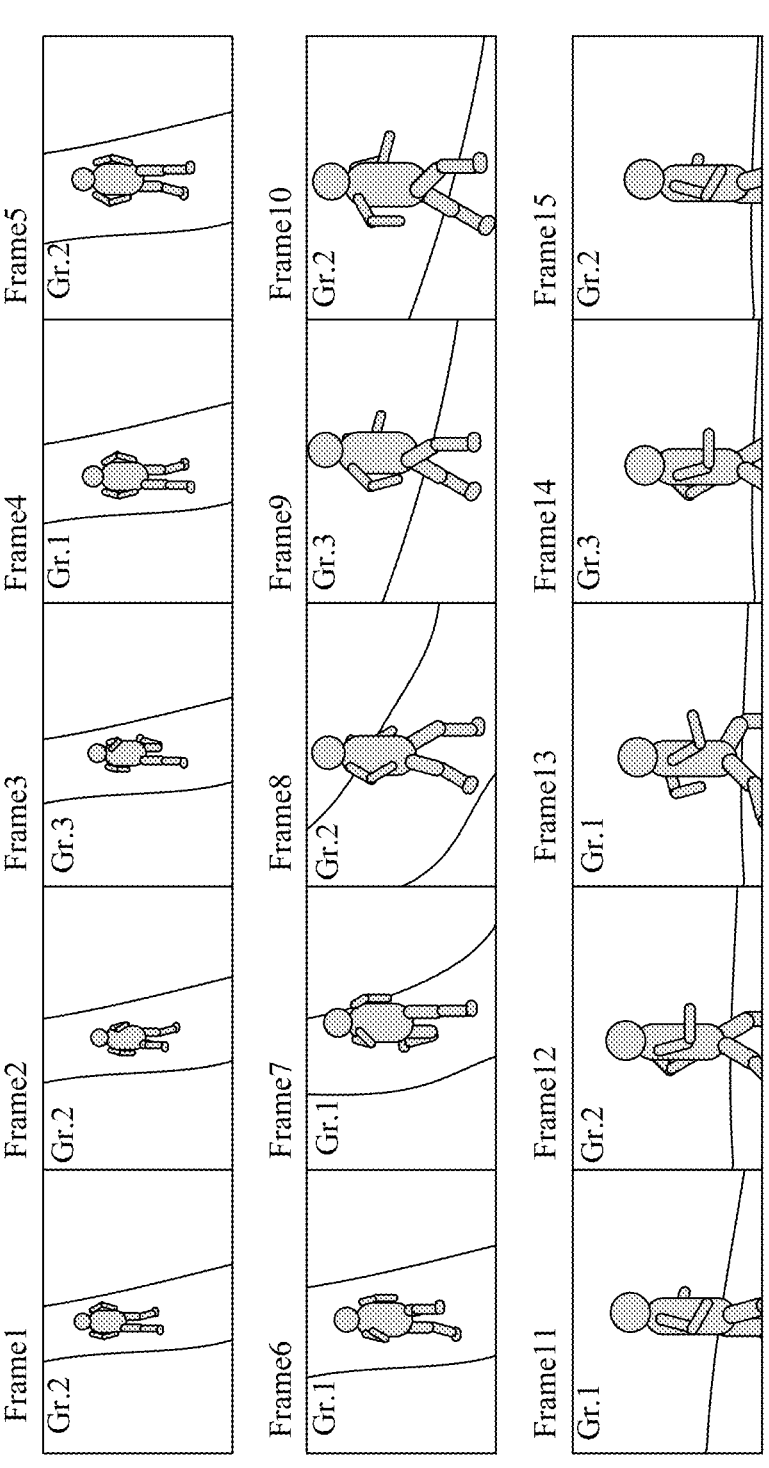
FIG. 20 illustrates a result of the second grouping according to the first embodiment.

FIG. 20 illustrates the result of the second grouping in S1005 on the image group illustrated in FIG. 19. A group name (information indicating the classification processing result) indicating a focus state is shown at the upper left of each captured image as a front focus (Gr. 1), a nearly in-focus (Gr. 2), and a rear focus (Gr. 3).

Figures 21A, 21B:
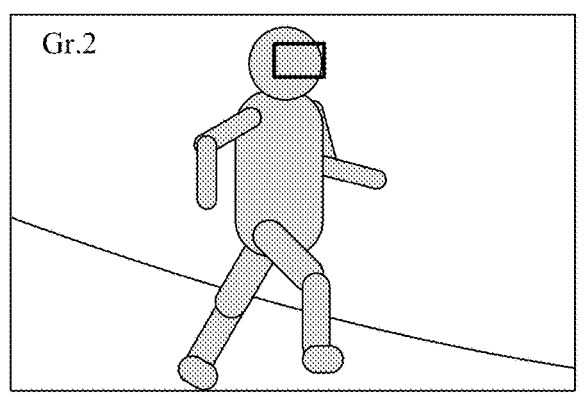
FIGS. 21A and 21B illustrate reproduced images after the second grouping according to the first embodiment.

FIGS. 21A and 21B illustrate the captured image Frame 10 after the second grouping reproduced and displayed on the display unit 131. The camera CPU 121 as the display processor performs image changing processing for changing an image to be reproduced and displayed on the display unit 131. FIG. 21A illustrates the entire captured image Frame 10, and FIG. 12B illustrates enlarged part of it. A group name (Gr. 2) indicating a focus state is displayed at the upper left of the captured image Frame 10.

The camera CPU 121 that has performed the processing in S1012 while displaying the captured image Frame 10 as illustrated in FIG. 21A instructs as the first image changing processing the display unit 131 to display a next chrono-logical image having the same focus state (belonging to the same group as the focus state). For example, when the operation button B2 illustrated in FIG. 13 is operated, a captured image Frame 8 is displayed, and when the opera-tion button B4 is operated, a captured image Frame 12 is displayed.

The camera CPU 121 that has performed the processing in S1010 while displaying the captured image Frame 10 instructs as the second image changing processing the display unit 131 to display the captured images with differ-ent focus states (belonging to different groups of focus states) and close imaging times. For example, when the operation button B1 illustrated in FIG. 13 is operated, a captured image Frame 11 is displayed, and when the opera-tion button B3 is operated, a captured image Frame 9 is displayed.

Thus, when a large number of captured images having similar compositions are acquired by continuous imaging or the like, this embodiment quickly selects and reproduces a captured image of a desired composition (imaging time) or a captured image of a desired focus state. The plurality of captured images illustrated in FIGS. 19 and 20 may be collectively displayed as thumbnail images on the display unit 131 in order for the user to confirm the first grouping.

Figure 22A:
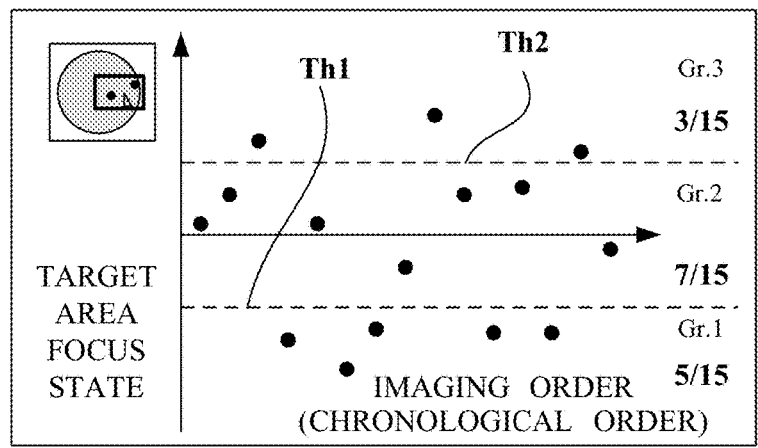
FIGS. 22A and 22B illustrate a focus state of a target area or a corresponding area in an image group that has received the first grouping according to the first embodiment.
Figure 22B:
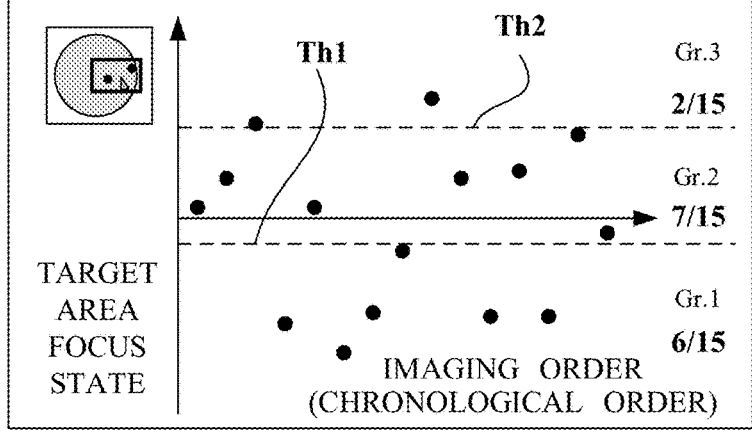

Referring now to FIGS. 22A and 22B, a description will be given of a method of changing a determination threshold set in S5002. FIGS. 22A and 22B illustrate the focus states of the target area and the corresponding area in the image group that has received the first grouping. The abscissa axis as the first scale indicates order of imaging time, and the ordinate axis as the second scale indicates the focus states of the target area and the corresponding area in unit of depth of focus. Fifteen black dots in the figure represent the focus states of the captured images Frame 1 to Frame illustrated in FIG. 20.

The upper left of the figure illustrates that an object area including the target area set by the user and its vicinity thereof is cut out of the captured image in which the target area is set. The right side of the figure illustrates the group name (Gr. 1, Gr. 2, and Gr. 3) indicating a focus state, and the number of captured images belonging to each group. For example, seven out of the fifteen captured images belong to the nearly in-focus group Gr. 2. A broken line indicates a boundary between the groups.

Where the user changes the determination threshold in S5002, the display unit 131 may display as illustrated in FIGS. 22A and 22B. This display enables the user to intuitively confirm the scattering status of the focus state in the image group. The user can also easily confirm how many captured images belong to each group.

When the determination threshold is changed, the display position of the broken line in the figure is changed, so that the operation can be made while the user can confirm that how many captured images belong to each group on a real-time basis. The instruction to change the determination threshold performed by the camera CPU 121 as an evalua-tion updater may be performed by the operation of the touch panel or the operation of the dedicated operation member.

FIGS. 22A and 22B illustrate display changes on the display unit 131 when the determination threshold is changed by the user operation. Relative to FIG. 22A, FIG. 22B illustrates the position of the broken line (Th1, Th2) moved in the vertical direction. The number of captured images belonging to each group changes.

The first grouping may be variable in the display as illustrated in FIGS. 22A and 22B. In that case, a border settable in the abscissa axis direction may be provided, and may be made operable by the user.

This embodiment enables the distribution regarding the imaging time (first scale) and the focus state (second scale) to be easily visually recognized of the plurality of imaged images included in the image group by plotting the captured images with different focus states at different positions on the ordinate axis as a scatterplot illustrated in FIGS. 22A and 22B. The index for classifying a plurality of captured images included in the image group is not limited to the focus state. For example, when the object is a human face, the smiling degree may be quantified and shown on the ordinate axis. Then, depending on whether the smiling degree is smiling or heavy laughing, plotting may be made at different positions on the ordinate axis, and the boundary may be displayed. Thereby, the user can easily recognize how many favorite smile images there are and how the group is to be divided. The captured image may be classified according to the object face direction (front, right, left, etc.) regardless of the focus state or smiling degree.

This embodiment user-friendly shows how many cap-tured images belong to each of the groups having different focus states as illustrated in FIGS. 22A and 22B. Thereby, when the user changes the border of the grouping, he can confirm how many captured images belong to which group by the grouping.

When there are three indices for classifying a captured image, such as the imaging time, the focus state, and the smiling degree, the two indices to be used may be switched to display the group, or the color and size of the point to be plotted may be changed to use three indicators to display the group.

When the user finishes setting the determination thresh-old, the thumbnail displays of the plurality of captured images illustrated in FIG. 20 or single display of the single captured image illustrated in FIG. 21A may be performed based on the setting. When the group is selectable, the captured images in the selected group may be displayed as thumbnails or singularly.

As described above, this embodiment enables the user to easily confirm the focus states in the target area and the corresponding area according to the user's intention on a plurality of captured images.

First Variation

A refocus technology using light field information is known. This embodiment can obtain light field information corresponding to two divisions in the horizontal direction, but can obtain light field information corresponding to a larger number of divisions in the horizontal direction and in the vertical direction and can change the focus state by the refocus processing.

Figure 23:
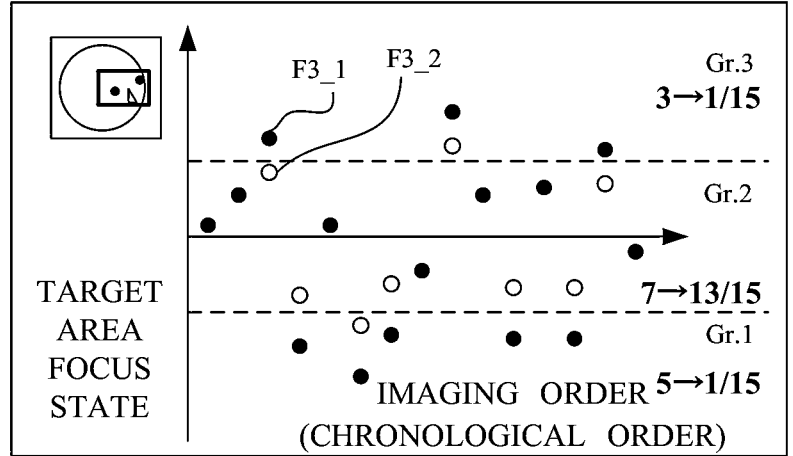
FIG. 23 illustrates a focus state of a target area or a corresponding area in an image group that has received the first grouping according to a variation.

Referring now to FIG. 23, a description will be given of a change of the focus state by the refocus processing. FIG. 23 illustrates a display example on the display unit 131 when the focus state of the captured image included in the image group after the first grouping is changed by the refocus processing. An abscissa axis indicates order of imaging time, and an ordinate axis indicates the focus state of the target area or the corresponding area. FIG. 23 illustrates an example in which the focus state of the captured image belonging to the in-focus nearby group (Gr. 2) is not changed, and the focus states of the captured images belonging to the front focus group (Gr. 1) and the rear focus group (Gr. 3) are changed by the refocus processing.

Fifteen black dots represent the focus states of the captured images Frame 1 to Frame 15 illustrated in FIG. 20. White dots represent the in-focus state after the refocus processing. For example, the black dot F3_1 represents the focus state of the captured image Frame 3 before the refocus processing, and the white dot F3_2 represents the focus state of the captured image Frame 3 after the refocus processing. The right side in FIG. 23 illustrates a change in the number of captured images belonging to each group before and after the refocus processing.

By displaying the focus state change caused by the refocus processing on the display unit 131 as described above, the user can easily confirm the distribution of the focus state in the image group.

Second Variation

When the user can extract a captured image with a desired focus state in the first embodiment, information on the set target area (and corresponding area) may be added to the captured image as incidental information. The information on the target area includes ID information of the captured image belonging to the image group, and information on the coordinates and sizes of the target area and the second evaluation area.

The ID information of the captured image belonging to the image group may be similarly added to all the captured images in the image group, so as to handle the case where each captured image is deleted.

Second Embodiment

Next follows a description of a second embodiment according to the present invention. This embodiment is different from the first embodiment in that this embodiment allows a single captured image to belong to a plurality of groups when the second grouping is performed by determining the focus state on each captured image in the image group that has received the first grouping.

The first embodiment has described grouping such that a single captured image belongs to a single group. However, when the user classifies the captured image according to a focus state, the user-friendliness is required. For example, the user may wish to extract a captured image in which the right eye instead of the left eye is focused from among a plurality of captured images in which the face of a person is focused. If there is a depth of focus difference between the left eye and the right eye, the user may perform an operation that allows the right eye to be focused. Then, the captured image with the focused left eye belongs to the rear focus or the front focus group for the captured image with the focused right eye.

However, when the object is far or imaging is performed with the narrowed F-number, there may be a captured image in which both the left eye and the right eye are focused in the image group. Such a captured image should be extracted as a captured image focused on the right eye as intended by the user, and also as a captured image focused on the left eye as not intended by the user.

Hence, this embodiment acquires information on the defocus amount difference (distance difference) of the object area and information on the defocus amount difference between the object and the background (surrounding object), and allows the captured image to belong to the group of a plurality of focus states according to the information. In other words, this variation classifies a captured image having a small defocus amount difference in the object area (lower than a predetermined value) into at least two of the plurality of groups. Thereby, the captured image intended by the user can be thoroughly extracted, and the user can efficiently select and confirm the captured image.

The configuration of the camera, the focus detection method, the focus detection area, the AF/imaging processing, and the image reproduction processing according to this embodiment are the same as the configuration of the camera 100 (FIG. 1), the focus detection method (FIG. 3A to FIG. 6), the focus detection area (FIG. 7), the AF/imaging processing (FIG. 8 to FIG. 10), and image reproduction processing (FIG. 11 to FIG. 17) according to the first embodiment.

Figure 24:
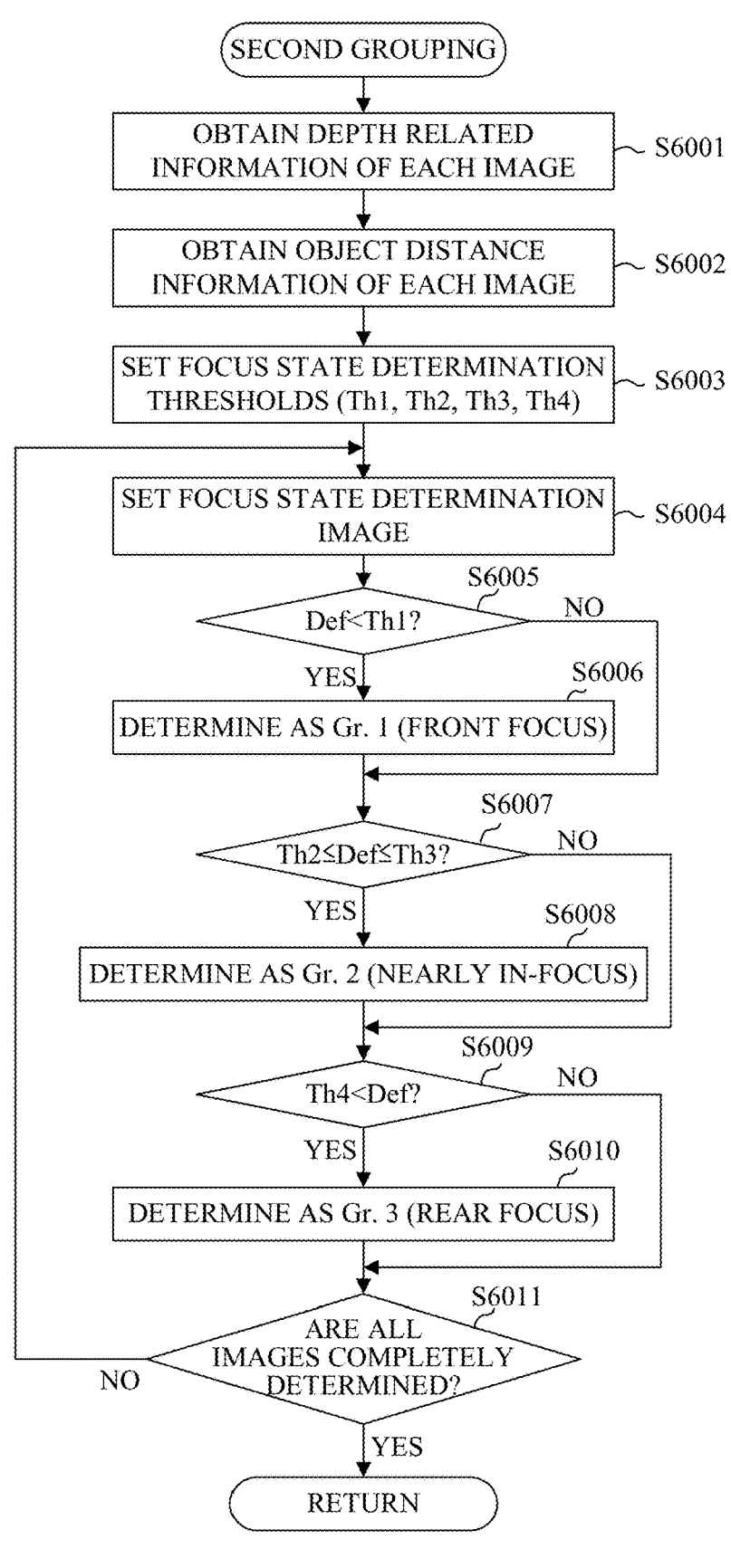
FIG. 24 is a flowchart showing a second grouping subroutine in the camera according to a second embodiment of the present invention.

Referring now to a flowchart in FIG. 24, a description will be given of classification (second grouping) processing of the image group performed by the camera CPU 121 in S1005 in FIG. 11 according to this embodiment.

In S6001, the camera CPU 121 acquires the depth related information from a plurality of images included in the image group. The depth related information is information of the permissible circle of confusion c and the F-number F as described in S5001 in FIG. 18. The camera CPU 121 calculates the depth of focus ($\pm$cF) in each captured image.

Next, in S6002, the camera CPU 121 acquires distance information of the object area in each captured image. A method of acquiring the distance information of an object area will be described with reference to FIGS. 25A and 25B.

Figures 25A, 25B:
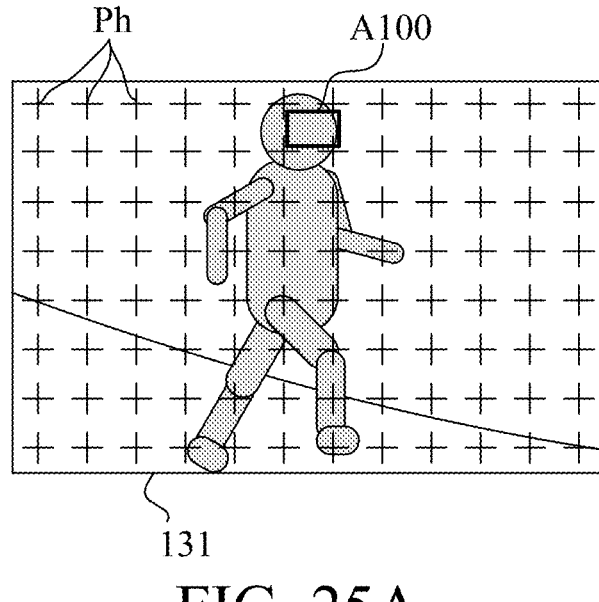
FIGS. 25A and 25B explain a method of acquiring distance information of an object area in a camera according to the second embodiment.

FIG. 25A illustrates, in addition to the state in which the target area A100 is set on the captured image Frame 10 illustrated in FIG. 12A, a superimposed focus detection point used to obtain a detection of the object area and distance information of the object area. FIG. 25A illustrates totally 96 cross marks Ph or 12 cross marks in the horizontal direction and 8 cross marks in the vertical direction as focus detection points.

Figure 15:
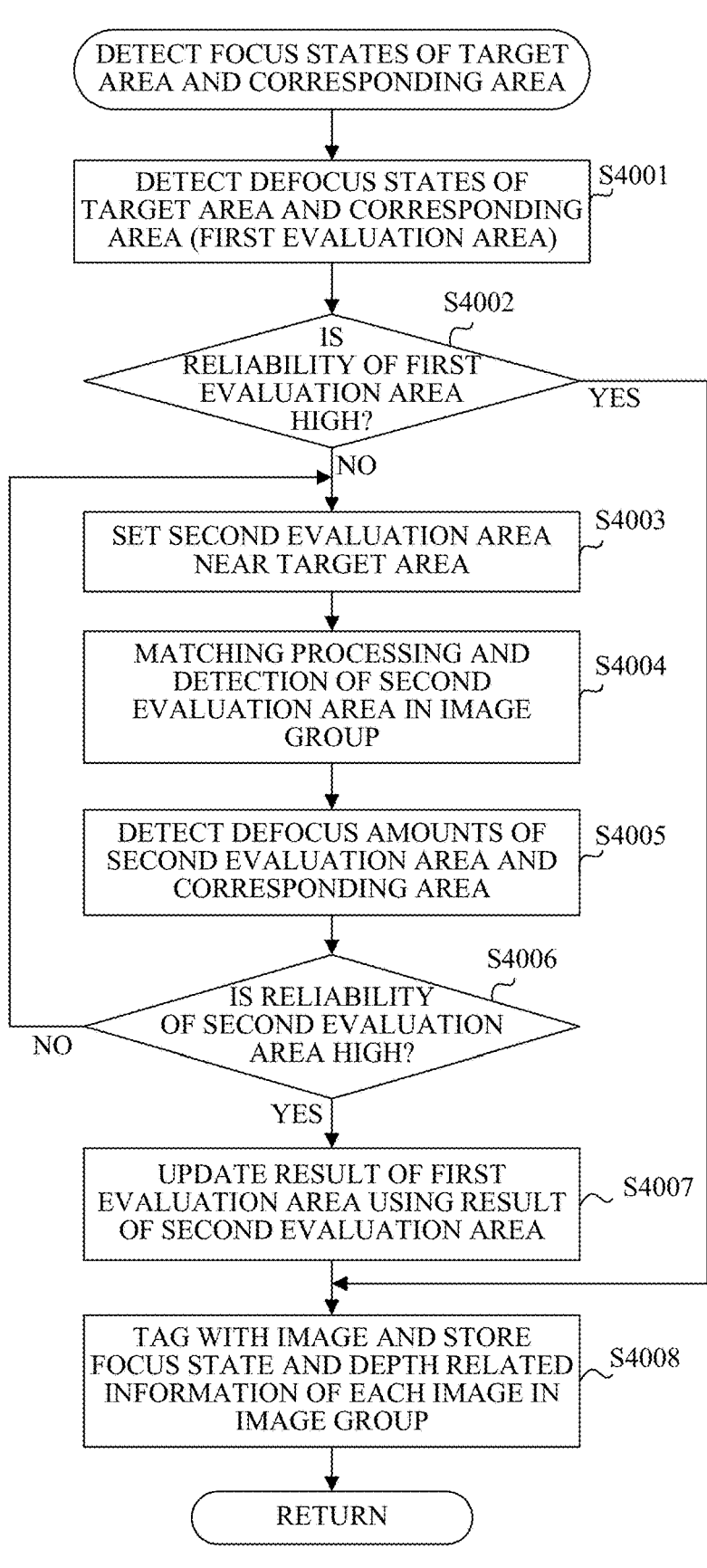
FIG. 15 is a flowchart showing a focus state detection subroutine in the camera according to the first embodiment.

In this embodiment, the camera CPU 121 detects the phase difference (image shift amount) at totally 96 focus detection points similar to S4001 in FIG. 15, and calculates the defocus amount or the object distance. Then, the camera CPU 121 first extracts an object area from the obtained defocus amount or object distance at each focus detection point. More specifically, the camera CPU 121 extracts, as an object area, an area having a small difference in which the defocus amount or the object distance is less than that of the target area by a predetermined value. If the object is a person, the object area may be extracted by detecting the body or organ.

The camera CPU 121 calculates the object distance as a representative value using the defocus amount obtained at the focus detection point arranged in the object area and the position of the focus lens 105 in acquiring each captured image. FIG. 25B illustrates the object distances obtained from the fifteen captured images illustrated in FIG. 19. The ordinate axis represents the object distance, and the abscissa axis represents imaging time order. A broken line indicative of the object distance D shows that the object gradually approaches from a long distance and the distance is substantially unchanged in the last few captured images. An object distance D(1) represents the object distance in the first captured image (Frame 1), and the object distance D(15) represents the object distance in the fifteenth captured image (Frame 15).

When the F-number and the focal length of the imaging optical system are constant, the depth of field changes with the object distance. More specifically, as the object distance increases, the depth of field becomes wider (deeper). This embodiment determines the focus state based on the change in the depth of field.

Next, in S6003, the camera CPU 121 sets the determination threshold that is the threshold used to determine the focus state. More specifically, the camera CPU 121 sets the determination threshold Th2=−εF/2 on the front focus side in-focus state and the determination threshold Th3=+εF/2 on the rear focus side in-focus state. The camera CPU 121 further sets the determination threshold Th1 used to determine the front focus state and the determination threshold Th4 used to determine the rear focus state. Since the determination thresholds Th1 and Th4 differ depending on the depth of field of each captured image, when they are expressed as Th1(i) and Th4(i), they are calculated by the following expressions (6) and (7).

$$Th1(i)=-\varepsilon F \times D(i)^2/D(15)^2 1 \leq i \leq 15 \qquad (6)$$

$$Th4(i)=+\varepsilon F \times D(i)^2/D(15)^2 1 \leq i \leq 15 \qquad (7)$$

Figure 26:
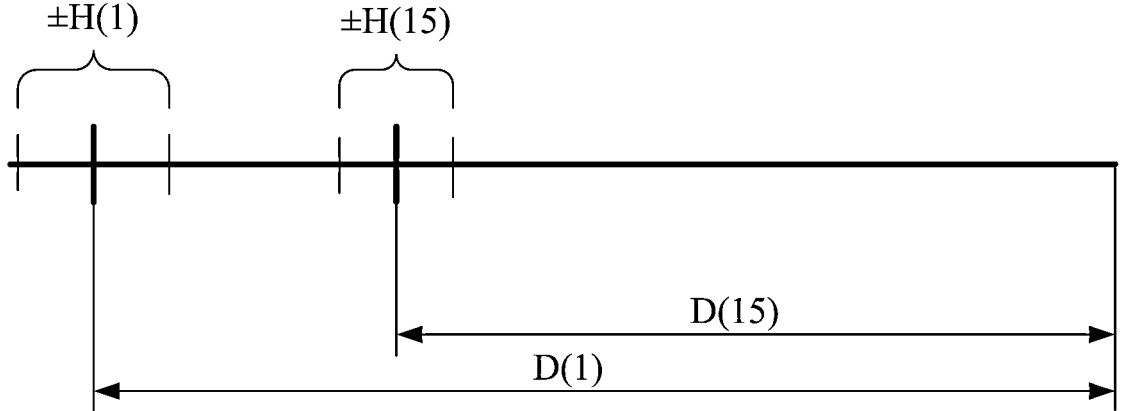
FIG. 26 explains a difference in the depth of field according to the object distance in the second embodiment.

Referring now to FIG. 26, a description will be given of a method of setting the determination thresholds for the front focus state and the rear focus state. FIG. 26 illustrates the object distance and the depth of field where Frame 1 and Frame 15 are captured. D(1) is an object distance when Frame 1 is imaged, and ±H(1) is a depth of field corresponding to the focal depth ±εF. Similarly, D(15) is an object distance when Frame 15 is imaged, and ±H(15) is a depth of field corresponding to the focal depth ±εF.

If the user desires a focus state in which the defocus amount of the target area shifts by the unit focal depth in reproducing and displaying the captured image Frame 15, this is the state focused on the object distance D(15)±H(15). For example, in changing the focus state from a state in which the right eye has a defocus amount of nearly 0 to a state in which the left eye shifting from the right eye by a unit depth of focus is focused, the user provides an operation such that the object distance to be focused moves from D(15) to H(15).

Even when this user operation is performed for the object at the object distance D(1), the distance between the left eye and the right eye does not change on the object, so the operation may be made to move the object distance to be focused from D(1) to H(15). Since the object distance D(1) is longer than D(15), the depth of field H(1) is deeper (wider) than H(15). Thus, the change amount of the focus state of H(15) to the object distance D(1) becomes a value smaller than the depth of focus εF. Assume that the ratio to be reduced is k. Then, k is calculated by the following expression (8).

$$k=H(15)/H(1)=D(15)^2/D(1)^2 \qquad (8)$$

In the expression (8), k is calculated without discriminating the front side depth of field and the rear side depth of field from each other, and by assuming that the depth of field as an approximate value is calculated by dividing the square of the object distance by the square of the focal distance. In order to increase the calculation accuracy of k, the depth of field may be divided into the front side depth of field and the rear side depth of field and used for the calculation.

The above expressions (6) and (7) calculate the determination thresholds Th1 and Th4 by multiplying the depth of focus εF by k calculated by the expression (8). Thereby, a captured image in a focus state similar to a selected focus state (such as a state in which the right eye or the left eye is focused) with a shallow depth of field can be thoroughly extracted from the captured images with long object distances and deep depth of fields. The focus state can be properly changed regardless of the object distance.

Figure 27:
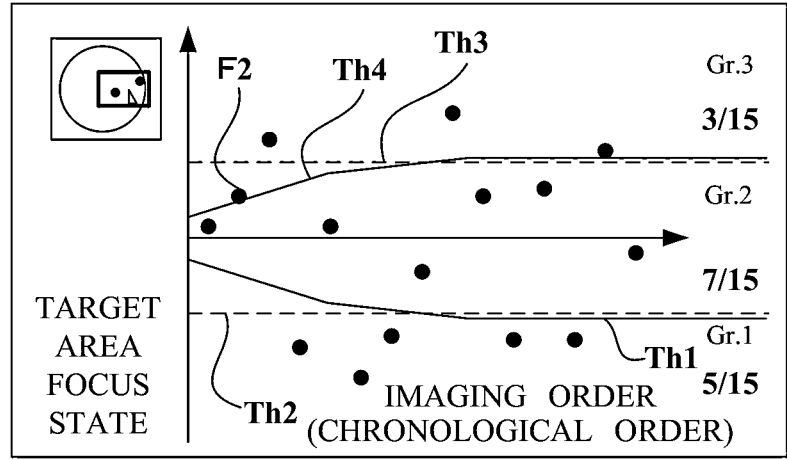
FIG. 27 illustrates a focus state of a target area or a corresponding area in an image group that has received the first grouping according to the second embodiment.

Referring now to FIG. 27 showing the focus states of the target area and the corresponding area in the image group that has received the first grouping, a description will be given of a state in which the determination threshold for the focus state is set in S6003. FIG. 27 illustrates the determination threshold Th2 for the front focus side in-focus state and the determination threshold Th3 for the rear focus side in-focus state by broken lines similar to the determination thresholds in FIGS. 22A and 22B. The determination threshold Th1 for the front focus state indicated by a solid line is equal to the determination threshold Th2 for the front focus side in-focus state in the latter half of the imaging time of the captured image, but changes to the upper side of the determination threshold Th2 for the front focus side in-focus state of the captured image (as it is closer to the in-focus state) in the former half of the imaging time. This is because, as described above, the range in which the focus state is maintained is different as the depth of field changes, and the border of the second grouping is changed.

Similarly, the determination threshold Th4 for the rear focus state indicated by the solid line is equal to the determination threshold Th3 for the rear focus side in-focus state in the latter half of the imaging time of the captured image, but changes to the lower side of the determination threshold Th3 for the rear focus side in-focus state of the captured image (as it is closer to the in-focus state) in the former half of the imaging time.

FIG. 27 user-friendly shows the determination thresholds Th2 and Th3 of the captured image in the latter half of the imaging time slightly shifted from the determination thresholds Th1 and Th4.

In FIG. 27, since the focus state F2 of the second captured image is located between Th2 and Th3, the second captured image belongs to Gr. 2. On the other hand, since F2 is larger than Th4, the second captured image also belongs to Gr. 3. Then, even when the user extracts the captured image belonging to Gr. 2 or Gr. 3, the second captured image can be reproduced and displayed. Hence, the captured image can be thoroughly reproduced and displayed in the focus state desired by the user.

The display performed as illustrated in FIG. 27 enables the user to easily confirm the area belonging to a plurality of groups on the scatterplot. As described in the first embodiment, the determination threshold used to determine the focus state can be easily changed.

Figure 18:
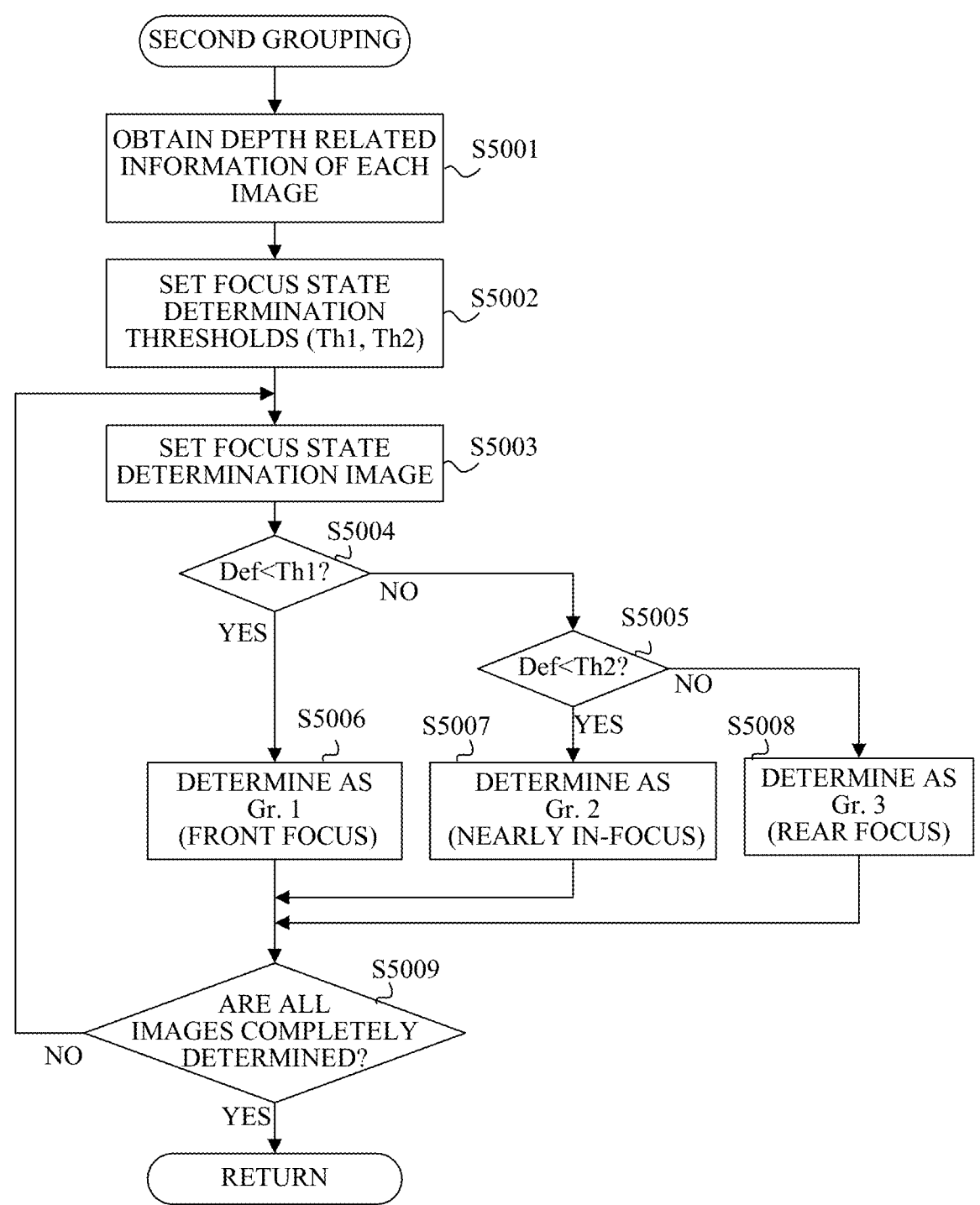
FIG. 18 is a flowchart showing a second grouping subroutine in the camera according to the first embodiment.

The camera CPU 121 that has completed S6003 proceeds to S6004 and sets a determination image as a captured image used to determine the focus state from the image group, similar to S5003 in FIG. 18.

Next, in S6005, the camera CPU 121 determines whether the defocus amount (focus state) of the target area or the corresponding area is smaller than the determination threshold Th1. If the defocus amount is smaller than the determination threshold Th1, the camera CPU 121 proceeds to S6006 and determines that the determination image belongs to the front focus group Gr. 1. Thereafter, the camera CPU 121 proceeds to S6007 regardless of the defocus amount.

In S6007, the camera CPU 121 determines whether the defocus amount is equal to or larger than the determination threshold Th2 and equal to or smaller than the determination threshold Th3. If the defocus amount is equal to or larger than the determination threshold Th2 and equal to or smaller than Th3, the camera CPU 121 proceeds to S6008 and determines the determination image belongs to the nearly in-focus group Gr. 2. Thereafter, the camera CPU 121 proceeds to S6009 regardless of the determination result in S6007.

In S6009, the camera CPU 121 determines whether the defocus amount is larger than the determination threshold Th4. If the defocus amount is larger than the determination threshold Th4, the camera CPU 121 proceeds to S6010 and determines that the determination image belongs to the rear focus group Gr. 3. Thereafter, the camera CPU 121 proceeds to S6011 regardless of the determination result of S6009.

In S6011, the camera CPU 121 determines whether the focus states have completely been determined for all captured images included in the image group. If the camera CPU 121 does not finish determining the focus state of all the captured images, the flow returns to S6004 to make a determination on the next captured image, and when the focus states have completely been determined for all the captured images, this subroutine ends.

Based on the fact that the change of the object distance in the area that provides a focus state desired by the user does not depend on the depth of field, this embodiment enables a single captured image to belong to groups having a plurality of focus states according to the status of the depth of field. Thereby, as described above, the captured images in which the focus state desired by the user is obtained can be thoroughly extracted, and the user can efficiently select and confirm the captured image.

This embodiment describes a case where the focal lengths and the F-numbers of a plurality of captured images included in the image group are equal, and the depth of field changes only by the object distance. However, even when the focal length and the F-number during imaging change, grouping (second grouping) in the focus state may be similarly performed based on the corresponding depth of field. As a result, the single captured image may belong to three or more groups.

This embodiment extracts the object area, calculates the object distance, and thereby acquires the change in the depth of field. However, the depth of field may be considered including the object area, the background, and other objects. For example, a captured image in which the entire imaging range including the object and the background is located within the depth of focus may belong to all groups as a result of the second grouping. The determination threshold used to determine the group may be changed using the information of the depth or distance in the object area. Thereby, the focus state can be properly changed according to the depth of the object.

The camera CPU 121 may change the determination threshold in accordance with the change of the defocus amount in the object area including the target area or the corresponding area and its surrounding area. For example, when the defocus amount change is small in the object area, the absolute value of the determination threshold is made smaller, and conversely when the defocus amount change is large in the object area, the absolute value of the determination threshold is made larger.

In this embodiment, the single captured image may belong to a plurality of groups having different focus states. Then, the display described with reference to FIGS. 20, 21A, and 21B in the first embodiment may display the characters and icons indicating a plurality of group names.

Each of the above embodiments describes the camera incorporating the image processing apparatus (camera CPU 121). However, another embodiment of the present invention covers an image processing apparatus configured by a mobile device such as a cellular or smart phone incorporating a camera and an image processing apparatus, and a personal computer having no imaging function.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications Nos. 2018-163565, filed on Aug. 31, 2018, 2018-229964, filed on Dec. 7, 2018, and 2018-229965, filed on Dec. 7, 2018, each of which is hereby incorporated by reference herein in its entirety.

What is claimed is:

1. An image processing apparatus comprising:

at least one processor; and at least one memory coupled to the at least one processor storing instructions that, when executed by the at least one processor, causes the at least one processor to function as:

(1) an area setter configured to set a target area to confirm a focus state in a first image of a plurality of images captured by imaging at mutually different times, wherein the target area is a user-specified target area specified by a user via a user interface;

(2) an acquirer configured to acquire, from each of the plurality of images, information on a first scale and a second scale, wherein the first scale represents imaging time and the second scale represents a focus state;

(3) an evaluation updater configured to update an evaluation regarding at least one of the first scale and the second scale, wherein the evaluation updater modifies a threshold used to classify the focus state of the images and dynamically applies the modified threshold to reclassify the images;

(4) an image group setter configured to (a) detect, from second images of the plurality of images, an image including a corresponding area having relevance to the target area and (b) set the detected image and the first image as an image group on the first scale;

(5) a classification processor configured to perform classification processing that classifies the image group into a plurality of groups using the second scale; and (6) a display processor configured to control a display unit to display information on the image, wherein the classification processor updates the plurality of groups as the evaluation updater updates the evaluation.

2. The image processing apparatus according to claim 1, wherein the display processor controls the display unit to display information on the number of images in the group.

3. The image processing apparatus according to claim 2, wherein the information on the number of images is information of a distribution in the first scale and the second scale.

4. The image processing apparatus according to claim 2, wherein the information on the number of images is a numerical value indicating the number of images in the group.

5. The image processing apparatus according to claim 1, wherein a threshold for the first scale or the second scale is variable when the classification processor classifies the plurality of images into the plurality of groups.

6. The image processing apparatus according to claim 1, wherein a change amount per unit of a threshold for the second scale is variable according to a depth, a width, and a size of the target area when the classification processor classifies the plurality of images into the plurality of groups.

7. The image processing apparatus according to claim 1, wherein the display unit displays a state in which the plurality of groups overlap each other.

8. The image processing apparatus according to claim 1, wherein the display unit displays at least one of the images in a selected one of the plurality of groups.

9. An electronic apparatus comprising:

an image sensor configured to capture an image of an object; and the image processing apparatus according to claim 1.

10. An image processing method comprising the steps of:

setting a target area to confirm a focus state in a first image of a plurality of images captured by imaging at mutually different times, wherein the target area is a user-specified target area specified by a user via a user interface;

acquiring, from each of the plurality of images, information on a first scale and a second scale, wherein the first scale represents imaging time and the second scale represents a focus state;

updating an evaluation regarding at least one of the first scale and the second scale, wherein the updating modifies a threshold used to classify the focus state of the images and dynamically applies the modified threshold to reclassify the images;

detecting, from second images of the plurality of images, an image including a corresponding area having relevance to the target area;

setting the detected image and the first image as an image group on the first scale;

performing classification processing that classifies the image group into a plurality of groups using the second scale; and controlling a display unit to display information on the image, wherein the plurality of groups is updated as the evaluation is updated.

11. A non-transitory computer-readable storage medium storing a program for causing an image processing apparatus to execute the image processing method according to claim 10.

* * * * *